(12) United States Patent
Suzuki

(10) Patent No.: US 10,011,169 B2
(45) Date of Patent: Jul. 3, 2018

(54) FILL-UP CONTROL VALVE DEVICE

(71) Applicant: KYOSAN DENKI CO., LTD., Koga, Ibaraki-Pref. (JP)

(72) Inventor: Keiji Suzuki, Oyama (JP)

(73) Assignee: KYOSAN DENKI CO., LTD., Koga (JP)

( * ) Notice: Subject to any disclaimer, the term of this patent is extended or adjusted under 35 U.S.C. 154(b) by 184 days.

(21) Appl. No.: 14/886,872

(22) Filed: Oct. 19, 2015

(65) Prior Publication Data

US 2016/0031315 A1 Feb. 4, 2016

Related U.S. Application Data

(63) Continuation of application No. 13/604,138, filed on Sep. 5, 2012, now Pat. No. 9,188,236.

(30) Foreign Application Priority Data

Sep. 26, 2011 (JP) ................... 2011-209208
Apr. 19, 2012 (JP) ................... 2012-095977

(51) Int. Cl.
*F16K 24/04* (2006.01)
*B60K 15/04* (2006.01)
*B60K 15/035* (2006.01)
*B60K 15/03* (2006.01)

(52) U.S. Cl.
CPC ............ *B60K 15/04* (2013.01); *B60K 15/035* (2013.01); *F16K 24/044* (2013.01); *B60K 15/03519* (2013.01); *B60K 2015/03289* (2013.01); *B60K 2015/03368* (2013.01)

(58) Field of Classification Search
CPC ............... B60K 15/035; B60K 15/04; B60K 15/03519; B60K 2015/03368; B60K 2015/03289; F16K 24/04; F16K 24/042; F16K 24/044
See application file for complete search history.

(56) References Cited

U.S. PATENT DOCUMENTS

| | | | |
|---|---|---|---|
| 3,765,435 A | 10/1973 | Schlanzky | |
| 4,991,615 A | 2/1991 | Szlaga et al. | |
| 5,044,397 A | 9/1991 | Szlaga et al. | |
| 5,762,090 A | 6/1998 | Halamish et al. | |

(Continued)

FOREIGN PATENT DOCUMENTS

| | | | |
|---|---|---|---|
| JP | S63-79355 U | 5/1988 | |
| JP | 2004-257264 A | 9/2004 | |

(Continued)

OTHER PUBLICATIONS

Jul. 6, 2015 Notice of Allowance issued in U.S. Appl. No. 13/604,138.

(Continued)

*Primary Examiner* — Ian Paquette
(74) *Attorney, Agent, or Firm* — Oliff PLC

(57) ABSTRACT

A casing includes a container in which a float valve is disposed. When the float valve is closed, the casing keeps the float valve in a closed state for a relatively long period of time. A sub-float valve is provided below the container in the casing, and is closed by floating on fuel at the time of a turn of a vehicle or an automatic stop of first refueling. When the first refueling is completed, air in the sub-float valve is discharged, and the sub-float valve loses its floating function.

42 Claims, 13 Drawing Sheets

(56) References Cited

U.S. PATENT DOCUMENTS

| | | | |
|---|---|---|---|
| 6,336,466 B1 | 1/2002 | Ganachaud et al. |
| 6,601,601 B2 | 8/2003 | Tamian |
| 2001/0054438 A1 | 12/2001 | Shimamura et al. |
| 2006/0042690 A1 | 3/2006 | Aoki et al. |
| 2006/0065305 A1 | 3/2006 | Nojiri et al. |
| 2006/0213555 A1 | 9/2006 | Miura et al. |
| 2010/0224265 A1 | 9/2010 | Kobayashi et al. |

FOREIGN PATENT DOCUMENTS

| | | | |
|---|---|---|---|
| JP | 2006-097537 A | 4/2006 |
| JP | 2006-266096 A | 10/2006 |
| JP | 2011-178379 A | 9/2011 |

OTHER PUBLICATIONS

Jan. 29, 2015 Office Action issued in U.S. Appl. No. 13/604,138.
Jul. 24, 2014 Office Action issued in U.S. Appl. No. 13/604,138.
Mar. 8, 2016 Office Action issued in Japanese Patent Application No. 2015-106756.
Jan. 31, 2018 Office Action issued in Chinese Patent Application No. 201610537863.1

F I G . 3
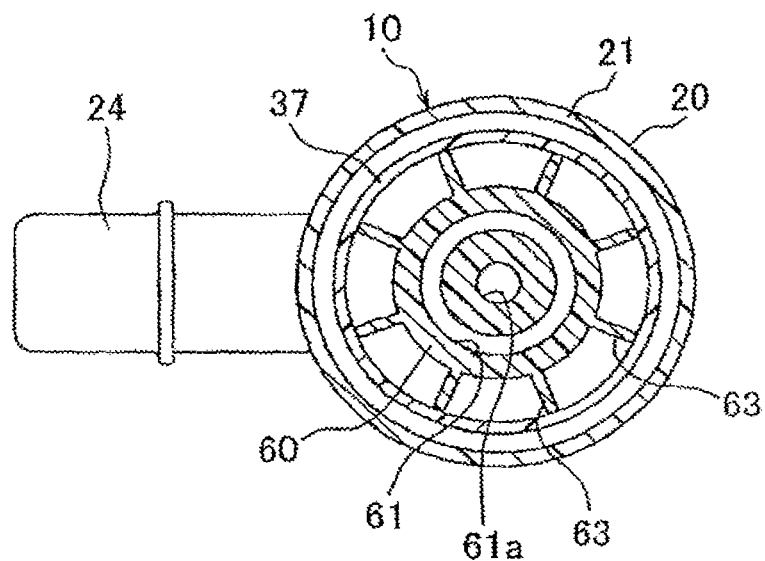
F I G . 4
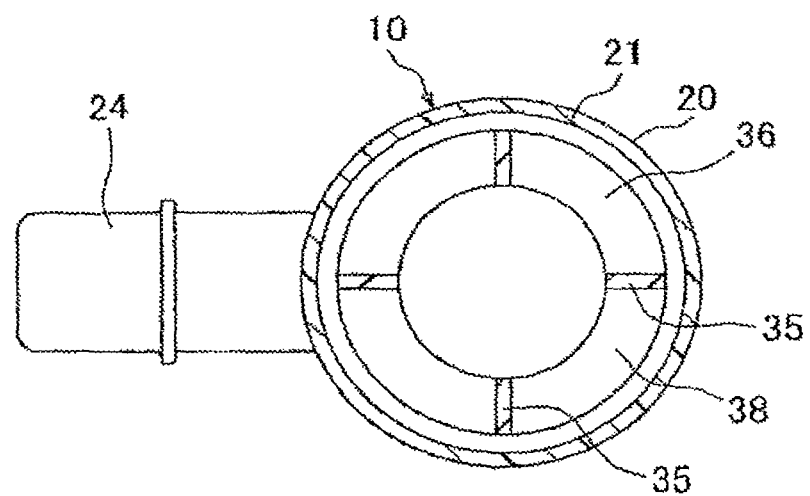

F I G. 9
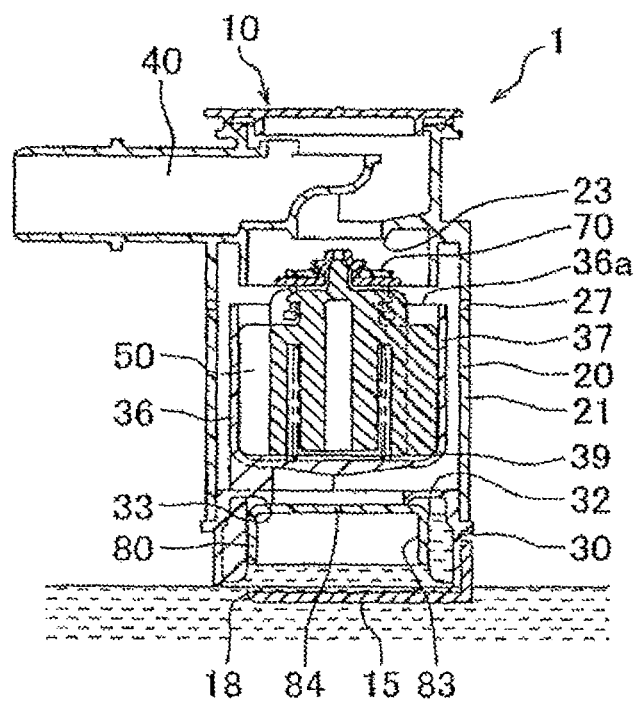
F I G. 10
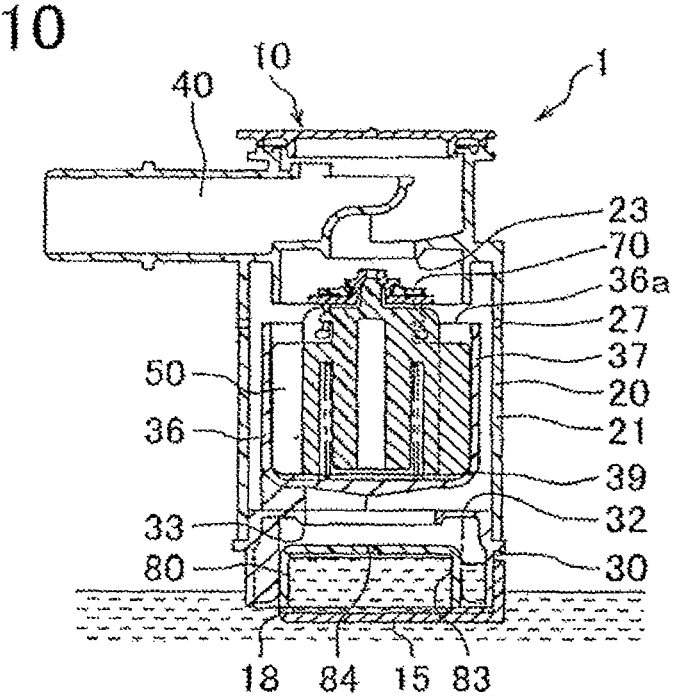

FILL-UP CONTROL VALVE DEVICE

INCORPORATION BY REFERENCE

This is a Continuation of application Ser. No. 13/604,138 filed Sep. 5, 2012, which claims the benefit of foreign priority to Japanese Patent Application No. 2011-209208 and 2012-095977 filed on Sep. 26, 2011 and Apr. 19, 2012, respectively. The disclosure of the prior applications is hereby incorporated by reference herein in its entirety.

BACKGROUND OF THE INVENTION

1. Field of the Invention

The present invention relates to a fill-up control valve device that is provided in a ventilation passage that communicably connects an interior space and an exterior space of a fuel tank.

2. Description of Related Art

Fill-up control valve devices, as an art related to the present invention, include a float valve in a casing mounted to a fuel tank. The float valve floats on liquid fuel. When a fuel surface in the fuel tank rises and reaches a first predetermined level or a fill-up level, a surface of fuel introduced from a lower vent hole into the casing is pressed up to a second predetermined level higher than the first predetermined level, so that the float valve is seated on a valve seat formed in an upper portion of the casing to close a ventilation passage that communicates between an interior and an exterior of the fuel tank.

Thus, when the fuel surface in the fuel tank rises and reaches the fill-up level through refueling from a refueling port, a pressure in the fuel tank increases. Accordingly, a fuel surface in a refueling pipe rises close to the refueling port. Additional refueling over the fill-up level is thereby prevented.

One of these known fill-up control valve devices has a minute vent hole for the purpose of reducing variations in pressure in the fuel tank after the fuel tank is filled up. The vent hole is formed on the casing at a location above the foregoing second predetermined level to communicate an interior space of the fuel tank with an interior space of the casing (see, for example, Japanese Patent Application Publication No. 2004-257264 (JP 2004-257264 A) described below).

However, in the fill-up control valve device according to the related art, a ventilation passage that communicates between an interior and an exterior of the fuel tank is blocked when a fuel surface in the fuel tank reaches the fill-up level positioned at a lower end of the casing. Consequently, the pressure in the fuel tank is higher than the pressure in the casing, and the increase in pressure in the fuel tank causes the fuel surface in the casing to be pressed up so that a float valve closes the ventilation passage. However, because the vent hole is provided on the casing above the foregoing second predetermined level or the level of the pressed-up fuel surface, an air pressure in the casing and an air pressure in the fuel tank are balanced gradually. Liquid fuel in the casing is thereby drained from a lower vent hole. The float valve opens the ventilation passage relatively shortly after closing the ventilation passage. This causes the pressure in the fuel tank to decrease. Then, the fuel surface in the refueling pipe falls from the level close to the refueling port. This undesirably allows additional refueling although fuel tank is filled to the fill-up level, which is a problem. Therefore, desirably the float valve is kept in a closed state for an extended period of time in order to reliably prevent additional refueling after filling up the fuel tank.

SUMMARY OF THE INVENTION

The present invention provides a fill-up control valve device that can perform refueling even though a surface level in a fuel tank changes largely when a vehicle in which the fuel tank is installed makes a turn or the like immediately before refueling, and that can prevent overflow of fuel from a refueling port at the time of initial refueling.

A first aspect of the present invention is directed to a fill-up control valve device including: a casing which is mounted to a fuel tank installed in a vehicle and in which a ventilation passage that communicates an interior of the fuel tank with an exterior of the fuel tank to allow gas in the interior of the fuel tank to be discharged to the exterior of the fuel tank is formed; and a first float valve that is provided vertically movably in an accommodation space formed in the casing, that floats on liquid fuel in the casing, and that opens and closes the ventilation passage with a vertical movement of a fuel surface in the casing, in which: the first float valve closes the ventilation passage when a fuel surface in the fuel tank rises and reaches a first predetermined level, and a fuel surface in the casing is pressed up to a second predetermined level higher than the first predetermined level; and the casing has a vent hole that is provided above the second predetermined level and that communicates an interior space of the fuel tank with the accommodation space for the first float valve, wherein: the casing includes a container which has a bottom surface and in which the first float valve is disposed; the container includes an introduction port that is provided above the bottom surface and that introduces liquid fuel into the container until the liquid fuel reaches the second predetermined level, and a discharge passage that is provided below the introduction port to extend through the container and that discharges the liquid fuel introduced from the introduction port into the container to an exterior of the container. The discharge passage has a passage cross-sectional area smaller than an opening area of the introduction port. The fill-up control valve device includes a second float valve that is provided vertically movably in an accommodation space formed in an upstream portion of a location in the casing where the container is disposed in a discharge direction of the ventilation passage, and that opens and closes the ventilation passage with a vertical movement of a fuel surface in the casing. The second float valve has an air storage recess that is recessed upward from a lower-end surface, and an air-discharge hole that communicates the air storage recess with the ventilation passage located on a downstream side of the second float valve in the discharge direction. The second float valve floats on the liquid fuel in the casing to close the ventilation passage (i) when air is stored in the air storage recess in a case that a fuel surface in the fuel tank rises and reaches the first predetermined level, and then a fuel surface in the accommodation space formed in the upstream portion in the discharge direction in the casing is pressed up to a third predetermined level higher than the first predetermined level; and the second float valve does not float on the liquid fuel in the casing to open the ventilation passage (ii) when air in the air storage recess is discharged from the air-discharge hole and the liquid fuel enters into the air storage recess in a case that a fuel surface in the fuel tank rises and reaches the first predetermined level, and then a fuel surface in the accommodation space formed in the upstream portion in the discharge direction in the casing is pressed up to a third predetermined level higher than the first predetermined level.

According to the aspect of the present invention, when the fuel surface in the casing rises to the third predetermined level, the second float valve floats on the liquid fuel to close the ventilation passage, even though, for example, the vehicle in which the fuel tank is installed makes a turn or the like, and the fuel surface rises largely to or above the first predetermined level at the position where the fill-up control valve device is fitted into the fuel tank. The surface level changes relatively so abruptly when the vehicle makes a turn or the like that air in the air storage recess is hardly discharged from the air-discharge hole. When the fuel surface rises to the third predetermined level, the second float valve quickly closes the ventilation passage at the upstream portion of the container in the discharge direction. When the fuel surface falls from the third predetermined level, the second float valve quickly opens the ventilation passage. Therefore, the liquid fuel can be prevented from entering into the container, and thus the first float valve can be prevented from being closed, even though the vehicle makes a turn or the like, and the surface level in the fuel tank changes largely. This allows refueling of the fuel tank even immediately after the vehicle makes a turn or the like. In addition, because air is hardly discharged from the air storage recess of the second float valve, the second float valve is not prevented from floating on the liquid fuel.

In the case that the vehicle stops running for refueling, air is stored in the air storage recess of the second float valve, even though the vehicle makes a turn or the like immediately before refueling. In this state, the fuel tank is refueled until a first operation of an automatic stop mechanism. When the fuel surface in the fuel tank reaches the first predetermined level, and then the fuel surface in the casing rises to the third predetermined level, the second float valve quickly closes the ventilation passage at the upstream portion of the container in the discharge direction. Therefore, the liquid fuel can be prevented from entering into the container at the time of a first automatic stop. Accordingly, the first float valve does not close the ventilation passage at the time of the first automatic stop, and thus gas in the fuel tank is discharged to the exterior of the fuel tank through the vent hole to suppress an increase in internal pressure of the fuel tank. Therefore, overflow of fuel from the refueling port of the fuel tank can be prevented at the time of the first automatic stop (at the time of initial refueling).

Because at the time of the first automatic stop, the fuel surface in the casing, which has risen to the third predetermined level, is maintained for some time, air in the air storage recess of the second float valve is discharged from the air-discharge hole, and liquid fuel enters into the air storage recess. This causes the second float valve to lose its floating function and to sink into the liquid fuel.

As described above, after the second float valve loses its floating function at the time of the first automatic stop, the liquid fuel in the casing is pressed up and introduced into the container at the time of a second automatic stop (at the time of additional refueling). When the fuel surface reaches the second predetermined level higher than the first predetermined level, the first float valve disposed in the container moves up to enter a closed state.

The casing has the vent hole at the location above the second predetermined level to communicate the interior space of the fuel tank with the accommodation space for the float valve, such that an air pressure in the casing and an air pressure in the fuel tank are balanced gradually. Because the introduction port for liquid fuel in the container is located above the bottom surface, the liquid fuel is stored, below the introduction port, in the container and is discharged from the discharge passage provided below the introduction port. The discharge passage has a passage cross-sectional area smaller than an opening area of the introduction port. This reduces the speed at which the liquid fuel is discharged from the container through the discharge passage. Therefore, the liquid fuel that is once introduced into the container is stored for a relatively long period of time. In this manner, the first float valve is kept in a closed state for an extended period of time, and further additional refueling can be prevented.

A second aspect of the present invention is directed to a fill-up control valve device including: a casing which is mounted to a fuel tank installed in a vehicle and in which a ventilation passage that communicates an interior of the fuel tank with an exterior of the fuel tank to allow gas in the interior of the fuel tank to be discharged to the exterior of the fuel tank is formed; and a first float valve that is provided vertically movably in an accommodation space formed in the casing, and that is configured to open and close the ventilation passage with a vertical movement of a fuel surface in the casing. The casing includes a container which has a bottom surface and in which the first float valve is disposed, and the container includes an introduction port that is provided above the bottom surface and that introduces liquid fuel into the container, and a discharge passage that is provided below the introduction port to extend through the container and that discharges the liquid fuel introduced from the introduction port into the container to an exterior of the container, wherein the discharge passage has a passage cross-sectional area smaller than an opening area of the introduction port. The casing further has a vent hole that is provided at a position as high as or higher than the introduction port, and that communicates an interior space of the fuel tank with the accommodation space; the fill-up control valve device further comprises a second float valve that is provided vertically movably in an accommodation space formed in an upstream portion of a location in the casing where the container is disposed in a discharge direction of the ventilation passage, and that is configured to open and close the ventilation passage with a vertical movement of a fuel surface in the casing. The second float valve has an air storage recess that is recessed upward from a lower-end surface, and an air-discharge hole that communicates the air storage recess with the ventilation passage located on a downstream side of the second float valve in the discharge direction.

As described above, the fill-up control valve device of the first and second aspects of the present invention can perform refueling even though the surface level in the fuel tank changes largely when the vehicle on which the fuel tank is installed makes a turn or the like immediately before refueling, and can also prevent overflow of fuel from the refueling port at the time of the initial refueling.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a sectional view taken along the line III-III in FIG. 2;

FIG. 4 is a sectional view taken along the line IV-IV in FIG. 2;

FIG. 9 is a sectional view that illustrates an operation of the fill-up control valve device 1;

FIG. 10 is a sectional view that illustrates an operation of the fill-up control valve device 1;

DETAILED DESCRIPTION OF EMBODIMENTS

Figure 1:
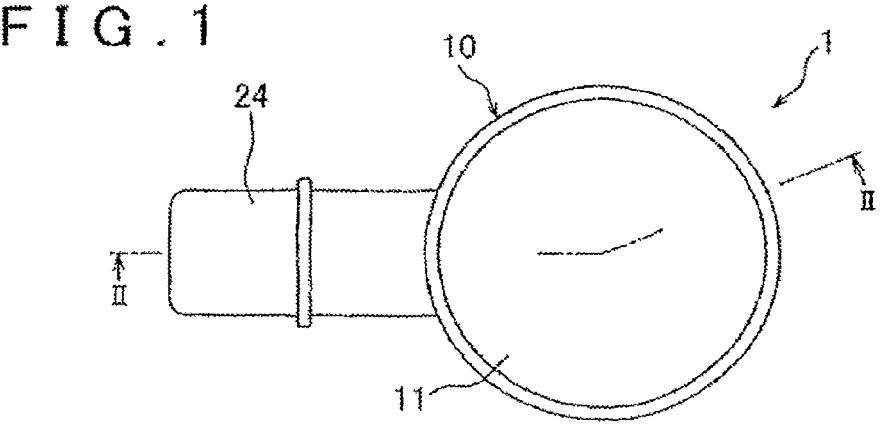
FIG. 1 is a top plan view that illustrates a schematic structure of a fill-up control valve device 1 according to a first embodiment to which the present invention is applied.

A plurality of embodiments for carrying out the present invention will be described hereinafter with reference to the accompanying drawings. In each of the embodiments, like reference numerals denote corresponding elements to those described in the preceding embodiment, and the descriptions thereof are not repeated sometime. When only a part of the configuration is described in each of the embodiments, the other part of the configuration is the same as described in the preceding embodiment. Not only the elements that are specifically described in the respective embodiments are combined, but also the embodiments can be partially combined, as long as there is no contradiction in the combination.

First Embodiment

Figure 2:
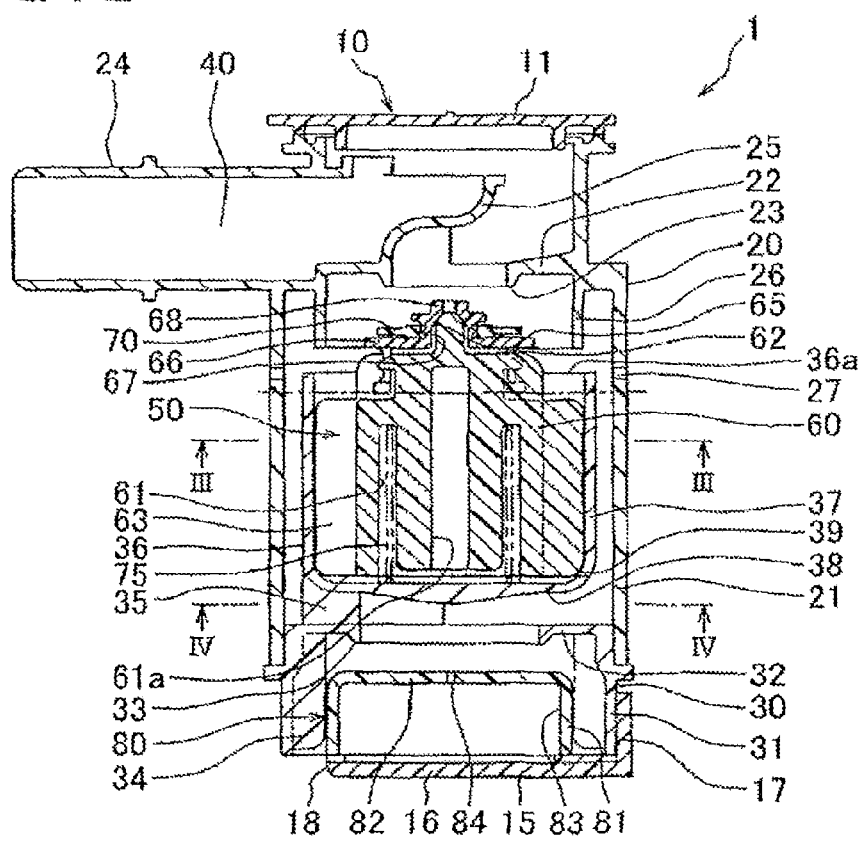
FIG. 2 is a sectional view taken along the line II-II in FIG. 1 and illustrates a schematic configuration of the fill-up control valve device 1.
Figure 5:
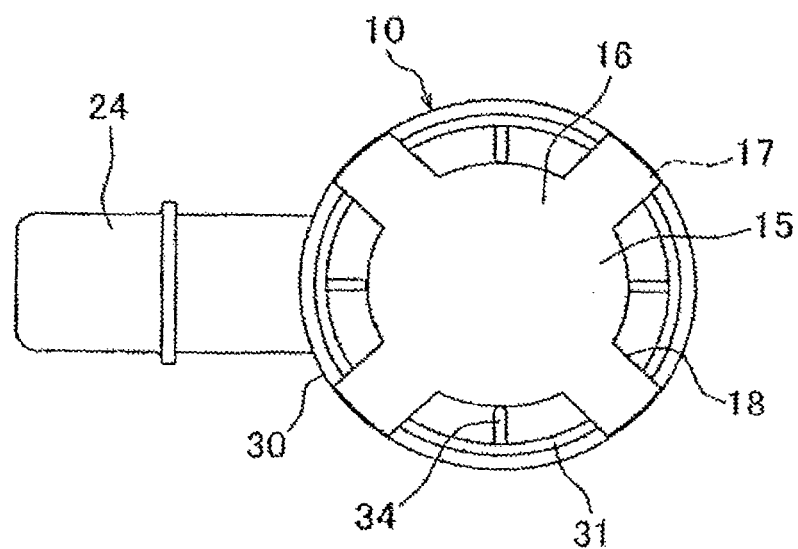
FIG. 5 is a bottom plan view of the fill-up control valve device 1.
Figure 6:
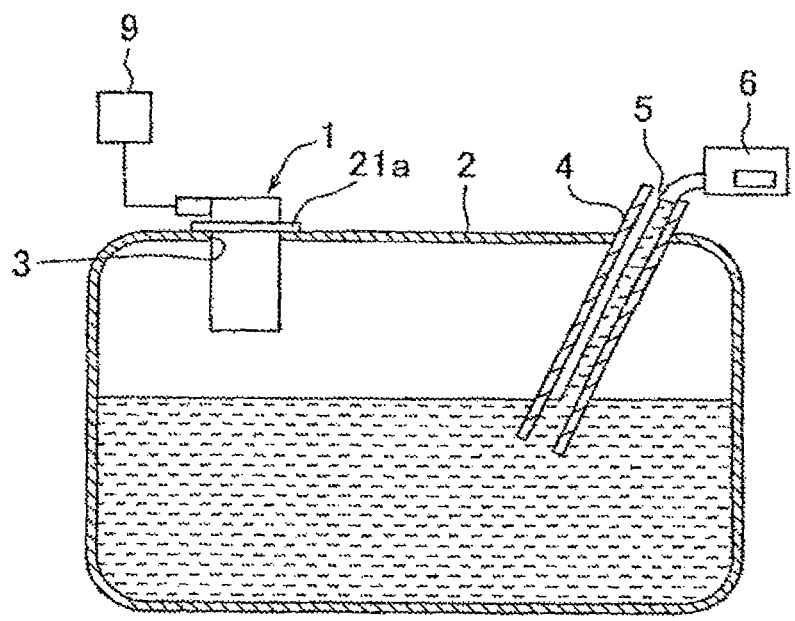
FIG. 6 is a sectional view that schematically illustrates a fuel tank 2 into which the fill-up control valve device 1 is fitted.

FIG. 1 is a top plan view of a fill-up control valve device 1 according to a first embodiment to which the present invention is applied. FIG. 2 is a sectional view taken along the line II-II in FIG. 1 and illustrates a schematic configuration of the fill-up control valve device 1. FIG. 3 is a sectional view taken along the line III-III in FIG. 2. FIG. 4 is a sectional view taken along the line IV-IV in FIG. 2. FIG. 5 is a bottom plan view of the fill-up control valve device 1. FIG. 6 is a sectional view that schematically illustrates a fuel tank 2 into which the fill-up control valve device 1 is fitted.

As shown in FIG. 6, the fill-up control valve device 1 is a valve device that is mounted into an opening 3 formed on a ceiling surface of the fuel tank 2 installed in a vehicle, for example, and that opens and closes a ventilation passage, depending on a surface level of liquid fuel (liquid level) in the fuel tank 2. The ventilation passage communicably connects an interior space of the fuel tank 2 and a canister 9 provided external to the fuel tank 2.

As shown in FIG. 2, the fill-up control valve device 1 includes a casing 10, and a float valve 50 (a main float valve corresponding to a first float valve) and a sub-float valve 80 (corresponding to a second float valve) that are accommodated in the casing 10. The casing 10 includes an upper case 20, a lower case 30, a cap 11, and an end cap 15, which are all made of resin, for example, and are connected to each other by welding, bonding, locking, or the like.

In the upper case 20, a cylindrical portion 21, an inward protrusion 22, a pipe 24, a shield wall 25, a shield plate 26, and so on are formed into one piece. The cylindrical portion 21 has a stepped cylindrical shape. A lower part of the cylindrical portion 21 (a part of the cylindrical portion 21, which is located below the step) has an outer diameter slightly smaller than the diameter of the opening 3 of the fuel tank 2 shown in FIG. 6. The cylindrical portion 21 includes a flange portion 21a (not shown in FIG. 1) at its lower part. The flange portion 21a is provided above a vent hole 27, to be described later, and extends along the entire periphery of the cylindrical portion 21, as shown in FIG. 6. The flange portion 21a has an outer diameter larger than the diameter of the opening 3 of the fuel tank 2. The flange portion 21a is not shown in FIGS. 7 to 12 that will be referred to later for further descriptions.

The inward protrusion 22 protrudes inward from an inner peripheral surface of the cylindrical portion 21 near its step and generally has a flat ring shape. A lower surface of an inner peripheral edge of the inward protrusion 22 serves as a valve seat 23 on which the float valve 50 is seated.

The pipe 24 extends sideward from an upper part of the cylindrical portion 21 (a part of the cylindrical portion 21, which is located above the step). A passage is formed within the pipe 24 to connect an interior of the casing 10 and the canister 9 (see FIG. 6).

The shield wall 25 is disposed inside the upper part of the cylindrical portion 21 to cover a central opening defined by the inner peripheral edge of the inward protrusion 22. The shield wall 25 is provided to prevent liquid fuel from entering into the pipe 24 if the liquid fuel moves up in the casing 10 and passes through the central opening of the inward protrusion 22.

The shield plate 26 is provided inside the lower part of the cylindrical portion 21 and extends downward in annular form from a base end of the inward protrusion 22 in its protruding direction. The shield plate 26 has a cylindrical shape and is provided to prevent liquid fuel that moves up in the casing 10 from directly reaching a sealing portion of the closed float valve 50.

The upper and lower parts of the cylindrical portion 21, the inward protrusion 22, and the shield plate 26 are all located coaxially. The cap 11 closes an upper end of the cylindrical portion 21 of the upper case 20.

In contrast, in the lower case 30, a cylindrical portion 31, an inward protrusion 32, guide ribs 34, connecting portions 35, a container 36, and so on are formed into one piece. A part of the cylindrical portion 31 above a flange protruded outwardly an outer peripheral surface of the cylindrical portion 31 as shown in FIG. 2 has an outer diameter substantially the same as the inner diameter of the lower part of the cylindrical portion 21 of the upper case 20. The upper part of the cylindrical portion 31 of the lower case 30 is fitted to the inside of a lower end edge of the cylindrical portion 21 of the upper case 20.

The inward protrusion 32 protrudes inward from an inner peripheral surface of the cylindrical portion 31 at its upper end edge and generally has a flat ring shape. A lower surface of an inner peripheral edge of the inward protrusion 32 serves as a valve seat 33 on which the sub-float valve 80 is seated. A plurality of the guide ribs 34 are provided on an inner peripheral surface of the cylindrical portion 31 at intervals in a circumferential direction and extend in a vertical direction. The guide ribs 34 guide the sub-float valve 80 by their respective inward distal ends when the sub-float valve 80 is displaced.

The container 36 has a cylindrical body with a bottom, and includes a cylinder-shaped sidewall 37 and a bottom surface (bottom) 38 that is formed to close a lower end of the sidewall 37. The container 36 is located inside the lower part of the cylindrical portion 21 of the upper case 20 above the inward protrusion 32. The inward protrusion 32 and the bottom surface 38 of the container 36 are connected through a plurality of the connecting portions 35 in plate form (see also FIG. 4).

The container 36 has an outer diameter smaller than the inner diameter of the cylindrical portion 21. The container 36 is disposed inside the cylindrical portion 21 to define a gap between the container 36 and the cylindrical portion 21. The sidewall 37 of the container 36 and the cylindrical portion 21 are located coaxially. Therefore, a dimension of the gap between the sidewall 37 of the container 36 and the cylindrical portion 21 is uniform in the circumferential direction. The inside of the container 36 serves as a space for accommodating the float valve 50.

The float valve 50 includes a float 60, a sealing plate 65, a valve body 70, a spring 75, and so on. The float 60 is a generally cylindrical column-shaped member made of resin, for example, and is relatively light weight. The float 60 is formed with an annular recess 61 and a central recess 61a that are recessed upward from the lower-surface side. The annular recess 61 and the central recess 61a are provided to function as a gas storage in fluid. In the annular recess 61, the spring 75 in the form of a coil is provided in a compressed manner. The spring 75 has an upper end that is in contact with an upper bottom surface (i.e. a ceiling surface) of the annular recess 61, and has a lower end that is in contact with the bottom surface 38 of the container 36. The spring 75 always urges (presses) the float 60 upward.

The float 60 has a bulging portion 62 that is formed at the center of an upper surface of the float 60 and that protrudes upward.

The sealing plate 65 is made of resin, for example, and is disposed above the float 60. In the sealing plate 65, a disk-shaped flat plate 66 and a generally cylinder-shaped tubular portion 68 are formed into one piece. The flat plate 66 is formed with a central small opening 67. The tubular portion 68 protrudes upward from the flat plate 66 around a peripheral edge of the small opening 67. The valve body 70 in a sheet form and made of rubber, for example, is disposed around an outer periphery of the tubular portion 68 to extend along an upper surface of the flat plate 66.

When the float valve 50 is displaced to the uppermost position, the valve body 70 annularly abuts the valve seat 23 of the upper case 20 to isolate the space for accommodating the float valve 50 from the upper part of the cylindrical portion 21 and from the ventilation passage in the pipe 24. The valve body 70 is a large-diameter sealing member that opens and closes the ventilation passage, which communicates the interior of the fuel tank 2 with the canister 9, to a larger extent at a location in the casing 10 where the inward protrusion 22 is formed. The bulging portion 62 of the float 60 is a small-diameter sealing member that is provided inside the valve body 70 and that opens and closes the ventilation passage (the small opening 67) to a smaller extent than the valve body 70 does.

As also shown in FIG. 3, a plurality of guide ribs 63 are provided on an outer peripheral surface of the float 60 at intervals in the circumferential direction and extend in the vertical direction. When the float valve 50 is displaced, the guide ribs 63 come into sliding contact, at their respective outward distal ends, with the sidewall 37 of the container 36 to guide the float valve 50.

A plurality of ribs that extend outward in a radial direction from the contact position of the spring 75 (a plurality of radially-extending ribs) are provided on an upper surface of the bottom surface 38 of the container 36. When the float valve 50 is displaced to the lowermost position, a lower surface of the float 60 abuts upper distal ends of the ribs. This prevents the float 60 from adhering to the bottom surface 38 of the container 36.

A small-diameter vent hole 27 is formed on the cylindrical portion 21 of the upper case 20 at a position as high as or higher than an upper end of the sidewall 37 of the container 36 (almost at the same height position as the upper end of the sidewall 37 in this example). The vent hole 27 extends through the cylindrical portion 21 in the radial direction.

A small-diameter liquid drainage hole 39 is formed on a lowest part (a connecting part with the bottom surface 38) of the sidewall 37 of the container 36 of the lower case 30. The liquid drainage hole 39 extends through the sidewall 37 in the radial direction. A passage sectional area of the liquid drainage hole 39 is set much smaller than an area of a part of the upper opening of the container 36, which is located more outward than the float 60.

This part of the upper opening of the container 36, which is located more outward than the float 60, serves as an introduction port 36a in the present embodiment. The liquid drainage hole 39 may be regarded as a discharge passage of the present invention.

As also shown in FIG. 5, in the end cap 15, a disk-shaped bottom plate 16 and a plurality of locking portions 17 are formed into one piece. The locking portions 17 extend upward from an outer peripheral portion of the bottom plate 16 and lock the cylindrical portion 31 of the lower case 30 on its outer peripheral surface. An arcuate notch 18 is formed along a part of an outer peripheral edge of the bottom plate 16 where the locking portions 17 are not connected. When the end cap 15 is attached to the lower case 30, the notch 18 defines an opening at a lower end of the casing 10.

A space for accommodating the sub-float valve 80 is defined inside the cylindrical portion 31 of the lower case 30 and above the bottom plate 16 of the end cap 15.

The sub-float valve 80 is made of resin, for example, in which a cylinder-shaped sidewall 81 and a ceiling 82 are formed into one piece. The sidewall 81 is in sliding contact with the guide ribs 34 of the lower case 30. The ceiling 82 closes an upper end of the sidewall 81. The sub-float valve 80 has a recess that is formed inside the sidewall 81 and is recessed upward from a lower end surface of the sub-float valve 80 to serve as an air storage recess 83 that can store therein air. The sub-float valve 80 has an air-discharge hole 84 that is formed at the center of the ceiling 82 and that extends through the ceiling 82 in the vertical direction.

The sub-float valve 80 floats on liquid fuel when a major portion of the air storage recess 83 is filled with air, and sinks into liquid fuel when air in the air storage recess 83 is discharged from the air-discharge hole 84 and the major portion of the air storage recess 83 is filled with liquid fuel.

When the sub-float valve 80 is displaced to the uppermost position, the ceiling 82 annularly abuts the valve seat 33 of the lower case 30 to isolate the space for accommodating the sub-float valve 80 from the ventilation passage located in the lower part of the cylindrical portion 21 of the upper case 20.

A plurality of ribs that extend in the radial direction (a plurality of radially-extending ribs) are provided on an upper surface of, and along an outer peripheral edge of, the bottom plate 16 of the end cap 15. When the sub-float valve 80 is displaced to the lowermost position, a lower-end surface of the sidewall 81 of the sub-float valve 80 abuts upper distal ends of the ribs. This prevents the sub-float valve 80 from adhering to the bottom plate 16 of the end cap 15.

According to the above configuration, a ventilation passage 40 that communicates an interior of the fuel tank 2 with an exterior of the fuel tank 2 is formed within the casing 10. This allows gas in the fuel tank 2 to be discharged to the exterior of the fuel tank 2 through the ventilation passage 40. Specifically, the ventilation passage 40 is formed within the casing 10 to ventilate the cylindrical portion 31 of the lower case 30, the cylindrical portion 21 of the upper case 20, and the pipe 24 successively from an end of the casing 10 at which the notch 18 of the end cap 15 is formed to allow gas in the fuel tank 2 to be discharged. The end of the casing at which the notch 18 is formed corresponds to an upstream end of gas within the casing 10.

At a location in the casing 10 where the container 36 is disposed, the float valve 50 accommodated in the container 36 opens and closes the ventilation passage 40. At an upstream portion of the location where the container 36 is disposed in a discharge direction (in a direction in which gas is discharged from the interior to the exterior of the fuel tank 2 in the ventilation passage 40), the sub-float valve 80 accommodated in the cylindrical portion 31 opens and closes the ventilation passage 40.

An operation of the fill-up control valve device 1 of the present embodiment is next described based on the above configuration and with reference to FIGS. 7 to 12.

First descriptions are made on a case where the vehicle in which the fuel tank 2 is installed makes a turn or the like, and the level of a fuel surface largely varies at a position where the fill-up control valve device 1 is fitted into the fuel tank 2. As the vehicle makes a turn or the like, a horizontal acceleration is applied accordingly. This causes liquid fuel to be unevenly distributed in the fuel tank 2. Therefore, a surface of the fuel can be inclined and the surface level can rise sometimes.

Figure 7:
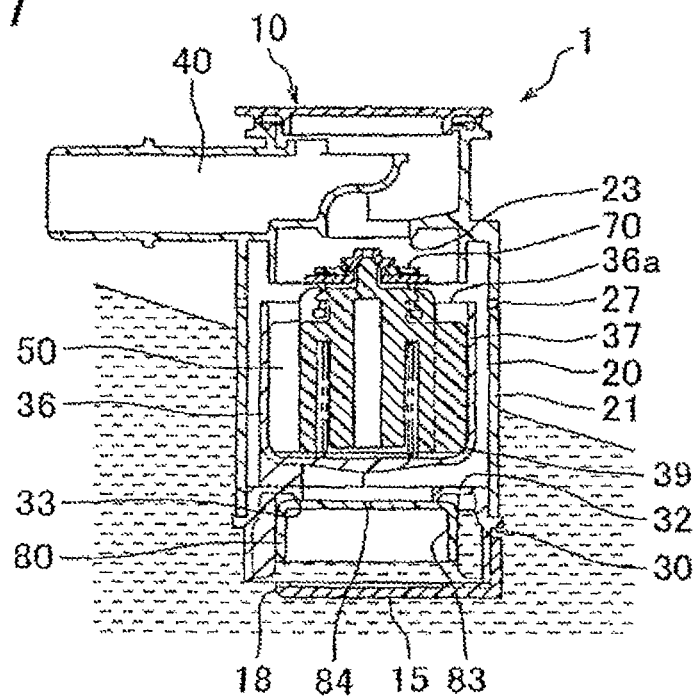
FIG. 7 is a sectional view that illustrates an operation of the fill-up control valve device 1.

In this case, as shown in FIG. 7, when the liquid fuel completely covers the lower end of the casing 10 of the fill-up control valve device 1 (when the fuel surface level reaches or exceeds a first predetermined level), the liquid fuel is pressed up into the lower case 30 from the notch 18 of the end cap 15.

Because at this time, the air storage recess 83 of the sub-float valve 80 is filled with air, the sub-float valve 80 floats on the liquid fuel pressed up into the lower case 30, and is seated on the valve seat 33 to close the ventilation passage 40. This permits no liquid fuel to enter into a position above the inward protrusion 32 or no liquid fuel to be introduced into the container 36, and consequently, the float valve 50 is not displaced. The surface level in the casing 10 at this time corresponds to a third predetermined level.

The surface level changes so abruptly when the vehicle makes a turn or the like that the state shown in FIG. 7 is maintained only for a very short period of time, and thus the surface level in the fuel tank 2 falls before air is discharged from the air-discharge hole 84 of the sub-float valve 80. Then, as shown in FIG. 8, the liquid fuel is drained from the lower case 30, and the sub-float valve 80 that has been floating on the liquid fuel returns to the lowermost position with the air storage recess 83 filled with air to immediately open the ventilation passage 40.

Descriptions are next made on a case where the vehicle stops running to refuel the fuel tank 2. Even when the surface level in the fuel tank 2 changes largely during running of the vehicle, the float valve 50 is not closed by the operation of the sub-float valve 80, as shown in FIG. 8. Therefore, refueling of the fuel tank 2 can be started even immediately after the vehicle makes a turn or the like.

Figure 8:
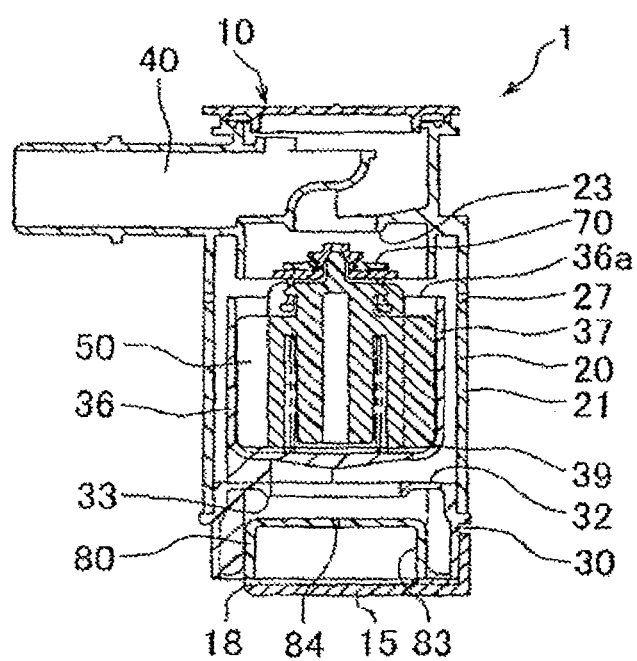
FIG. 8 is a sectional view that illustrates an operation of the fill-up control valve device 1.

When the surface level of the liquid fuel in the fuel tank 2 to which the fill-up control valve device 1 is mounted is lower than the fill-up level, as shown in FIG. 6, the float valve 50 and the sub-float valve 80 both are in an open state, as shown in FIG. 8. Therefore, as the fuel tank 2 is refueled with the liquid fuel from a refueling port 5 of a refueling pipe 4 (an inlet pipe) through a refueling gun 6, fuel vapors in an upper space of the fuel tank 2 pass from the lower end of the casing 10 through the ventilation passage 40 to the exterior of the fuel tank 2. Consequently, the pressure in the fuel tank 2 does not increase, and refueling of the fuel tank 2 can be continued.

As shown in FIG. 9, during continuous refueling, the surface of liquid fuel in the fuel tank 2 reaches the lower end of the casing 10 to close the lower-end opening defined by the notch 18, and consequently the pressure in the fuel tank 2 increases. Accordingly, the liquid fuel moves up in the lower case 30. The surface level in the fuel tank 2 at this time (a so-called fill-up surface level) corresponds to the first predetermined level.

As the fuel surface in the lower case 30 rises, the sub-float valve 80 floats with the air storage recess 83 filled with air. When the surface level reaches the third predetermined level, the sub-float valve 80 enters a closed state. When the sub-float valve 80 is in a closed state, the fuel surface in the refueling pipe 4 rises due to a further increase in pressure in the fuel tank 2. When the fuel surface reaches a distal end of the refueling gun 6, refueling is discontinued by an automatic stop mechanism, for example.

This permits no liquid fuel to enter into a position above the inward protrusion 32 or no liquid fuel to be introduced into the container 36, and consequently, the float valve 50 is not displaced. Because the flat valve 50 is open, gas in the fuel tank 2 is discharged to the exterior of the fuel tank 2 through the vent hole 27. This suppresses an increase in internal pressure of the fuel tank 2, and therefore can prevent overflow of fuel from the refueling port 5 of the fuel tank 2 at the time of a first automatic stop (at the time of initial refueling) where the fuel tank 2 is refueled with a relatively large amount of fuel and a large amount of fuel vapors are generated.

At the time of the first automatic stop, the surface level, which has risen in the lower case 30, is maintained for some time until the pressure in the fuel tank 2 decreases. Accordingly, air in the air storage recess 83 of the sub-float valve 80 is discharged upward from the air-discharge hole 84, and liquid fuel enters into the air storage recess 83. This causes the sub-float valve 80 to lose its floating function and to sink into the liquid fuel. FIG. 10 illustrates a state where when liquid fuel in the refueling pipe 4 is introduced into the fuel tank 2 after the first automatic stop, the surface level in the fuel tank 2 slightly rises, and the sub-float valve 80 loses its floating function and is open.

In the state shown in FIG. 10, the pressure in the fuel tank 2 is prevented from increasing, so that the surface level in the refueling pipe 4 falls to allow additional refueling. When the fuel tank 2 is refueled with additional liquid fuel from the refueling port 5 through the refueling gun 6, the liquid fuel moves up in the lower case 30.

Because at this time, the sub-float valve 80 does not function, the liquid fuel moves up also in the upper case 20 beyond the sidewall 37 of the container 36 and flows into the container 36 from the introduction port 36*a*. Consequently, the fuel surface in the container 36 rises.

Figure 11:
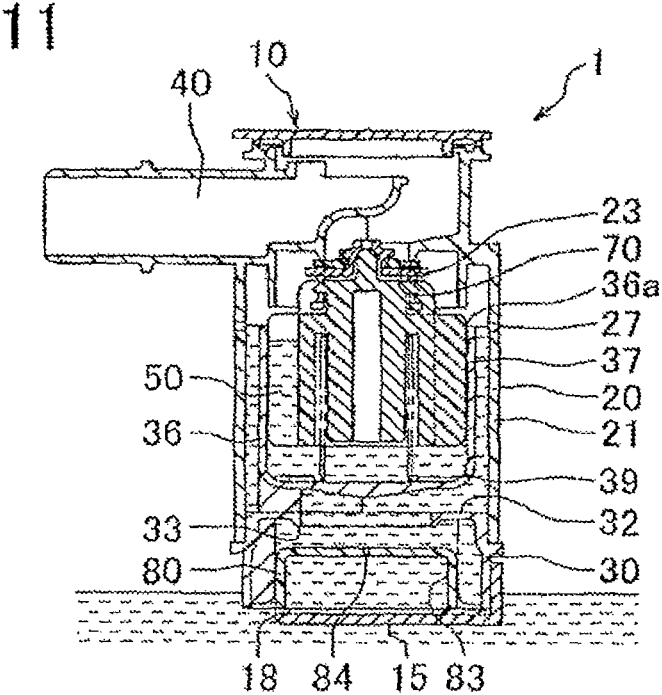
FIG. 11 is a sectional view that illustrates an operation of the fill-up control valve device 1.

As the fuel surface in the container 36 rises, the float valve 50 floats (is displaced upward). As shown in FIG. 11, the valve body 70 of the float valve 50 is seated on the valve seat 23, and the float valve 50 enters a closed state. The surface level in the casing 10 at this time corresponds to a second predetermined level. Because liquid fuel needs to move up beyond the sidewall 37 in order to introduce the liquid fuel into the container 36, the level of the upper end of the sidewall 37 of the container 36 corresponds to the second predetermined level.

However, in the fill-up control valve device 1 of the present embodiment, the float valve 50 is configured to be closed when liquid fuel is introduced into the container 36 to a surface level shown by a dot-and-dash line extending horizontally in FIG. 2. Therefore, the surface level shown by the dot-and-dash line may be regarded substantially as the second predetermined level. Thus, preferably the vent hole 27 provided on the upper case 20 is positioned as high as or higher than the upper end of the sidewall 37 of the container 36. However, the vent hole 27 may alternatively be positioned at or above the surface level shown by a dot-and-dash line in FIG. 2.

When the float valve 50 is in a closed state, the fuel surface in the casing 10 stops rising, while the fuel surface in the refueling pipe 4 rises due to an increase in pressure in the fuel tank 2. When the fuel surface reaches the distal end of the refueling gun 6, refueling is discontinued again by the automatic stop mechanism, for example.

When refueling is discontinued again, gas in the fuel tank 2 passes through the small-diameter vent hole 27 into the casing 10. This allows an air pressure in the lower part of the cylindrical portion 21 of the casing 10 and an air pressure in the fuel tank 2 to be balanced gradually. It takes a relatively short period of time for the liquid fuel in the casing 10, except the liquid fuel in the container 36, to be drained from the lower-end opening.

Figure 12:
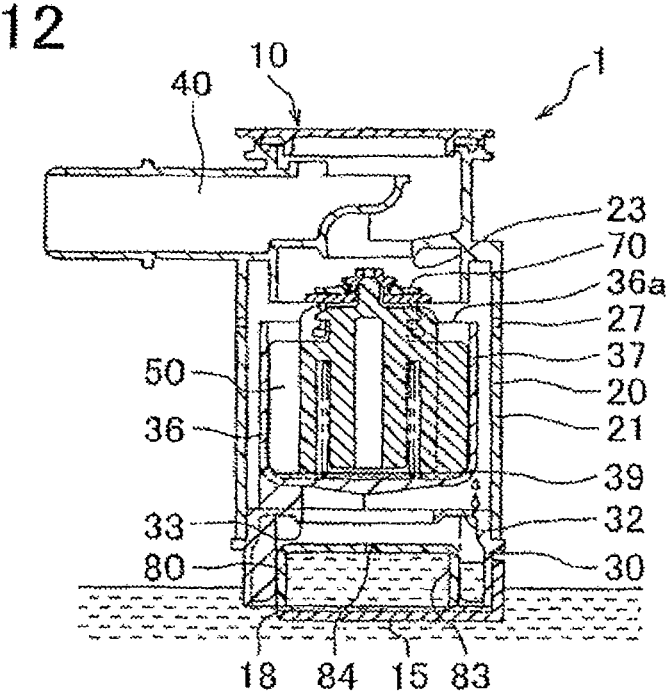
FIG. 12 is a sectional view that illustrates an operation of the fill-up control valve device 1.

Because the relatively small-diameter liquid drainage hole 39 is formed on the sidewall 37 of the container 36, the liquid fuel in the container 36 is gradually discharged from the container 36 through the liquid drainage hole 39. Accordingly, as shown in FIG. 12, the float valve 50 moves down to be in a open state where the valve body 70 is away from the valve seat 23 to open the ventilation passage 40, and thus allows ventilation between the interior and the exterior of the fuel tank 2 even after the fuel tank 2 is filled up with the liquid fuel.

When the float valve 50 is in an open state, the surface level in the refueling pipe 4 falls. However, in the fill-up control valve device 1 of the present embodiment, an internal volume of the container 36 and an opening diameter of the liquid drainage hole 39 are predetermined such that the float valve 50 is kept in a closed state for one to three minutes, for example. Thus, when the float valve 50 is in an open state and the surface level in the refueling pipe 4 falls, a refueling process is already completed. This can prevent further additional refueling from being performed.

When the float valve 50 is closed, the bulging portion 62 (a second small-diameter valve body) of the float 60 closes the small opening 67. When the float valve 50 is moving down, the bulging portion 62 opens the small opening 67 first to reduce a difference between pressures upstream and downstream of the sealing portion. This helps the valve body 70 (a first large-diameter valve body) be easily away from the valve seal 23 to open the float valve 50.

The above configuration and operations prevent the liquid fuel from entering into the container 36 and therefore can prevent the float valve 50 from being closed, even when the vehicle makes a turn or the like, and the surface level in the fuel tank 2 changes largely. Therefore, refueling of the fuel tank 2 can be performed even immediately after the vehicle makes a turn or the like. In addition, because air is hardly discharged from the air storage recess 83 of the sub-float valve 80, the sub-float valve 80 can maintain its floating function.

In the case that the vehicle stops running for refueling, the sub-float valve 80 is closed at the time of the first automatic stop to prevent liquid fuel from entering into the container 36. Therefore, because the float valve 50 is not closed at the time of the first automatic stop (at the time of the initial refueling), gas in the fuel tank 2 is discharged to the exterior of the fuel tank 2 through the vent hole 27 to prevent overflow of fuel from the refueling port 5 of the fuel tank 2. In addition, liquid fuel is introduced into the air storage recess 83 of the sub-float valve 80 to cause the sub-float valve 80 to lose its floating function.

Because the sub-float valve 80 has lost its floating function at the time of a second automatic stop (at the time of additional refueling), liquid fuel is introduced into the container 36 to close the float valve 50 to keep the float valve 50 in a closed state for a while. Therefore, further additional refueling can be prevented.

In this manner, refueling can be performed even though the surface level in the fuel tank 2 changes largely when the vehicle on which the fuel tank 2 is installed makes a turn or the like immediately before refueling, while preventing overflow of fuel from the refueling port 5 at the time of the initial refueling.

In the fill-up control valve device 1 of the present embodiment, the sub-float valve 80 is disposed below the float valve 50. Therefore, the fill-up control valve device 1 can have a smaller horizontal (radial) dimension. Accordingly, the opening 3 formed on the ceiling of the fuel tank 2 can have a smaller diameter.

Second Embodiment

A second embodiment of the present invention is next described with reference to FIG. 13.

The second embodiment of the invention is different from the foregoing first embodiment in that the sub-float valve 80 is provided with a partition wall 86. Like numerals denote like elements between the first and the second embodiments, and descriptions thereof are not repeated.

Figure 13:
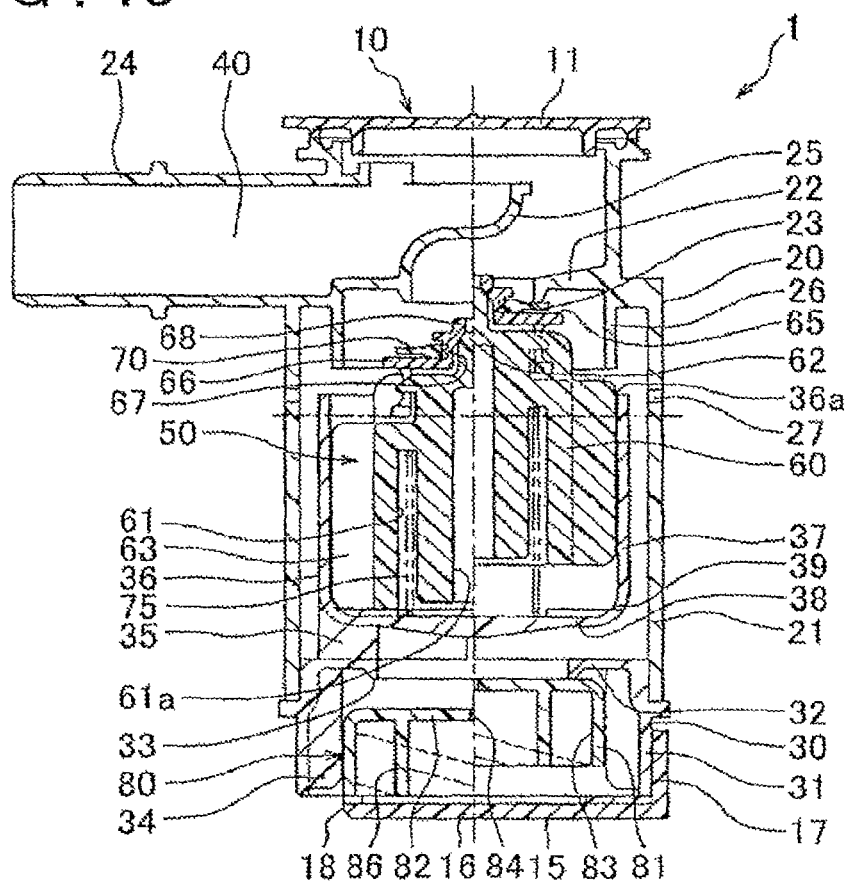
FIG. 13 is a sectional view that illustrates a schematic structure of a fill-up control valve device 1 according to a second embodiment of the invention.

As shown in FIG. 13, in the present embodiment, the air storage recess 83 of the sub-float valve 80 is partitioned into plural sections by the partition wall 86 that protrudes downward from the ceiling 82 (corresponding to an upper wall) (that extends downward from the upper wall). Consequently, each of the partitioned sections of the air storage recess 83 has a lower-end opening area smaller than the lower-end opening area of an unpartitioned air storage recess.

As described in the first embodiment, as the vehicle makes a turn or the like, a horizontal acceleration is applied accordingly. This causes liquid fuel to be unevenly distributed in the fuel tank 2. Therefore, a surface of the fuel is inclined and the surface level rises.

As the inclined fuel surface is moving up, the lower end of the sub-float valve 80 is covered by the liquid fuel. At the time when the sub-float valve 80 starts floating again, the liquid fuel enters into, for example, a position shown by a chain double-dashed line in FIG. 13 with the inclination of the fuel surface. In the fill-up control valve device 1 of the present embodiment, the air storage recess 83 is partitioned into plural sections to reduce an amount of the liquid fuel that enters into the air storage recess 83 at the time when the sub-float valve 80 starts floating in order to suppress a decrease in buoyancy of the sub-float valve 80. That is, degradation in the floating function of the sub-float valve 80 can be prevented.

In this regard, in the case that the sub-float valve 80 is not provided with the partition wall 86, liquid fuel enters into a position shown by a dotted line in FIG. 13. Therefore, buoyancy of this sub-float valve 80 decreases compared to the buoyancy obtained in the present embodiment.

The left side of the center line in FIG. 13 illustrates a state where the float valve 50 and the sub-float valve 80 are displaced to the lowermost position. The right side of the center line in FIG. 13 illustrates a state where the float valve 50 and the sub-float valve 80 are displaced to the upper most position. The same applies to FIGS. 16 to 21 that will be described later.

Third Embodiment

A third embodiment of the present invention is next described with reference to FIGS. 14 and 15.

The third embodiment of the invention is different from the foregoing first embodiment in that the sub-float valve 80 is provided with a bottom plate 87 to have a smaller lower-end opening area. Like numerals denote like elements between the first and the third embodiments, and descriptions thereof are not repeated.

Figure 14:
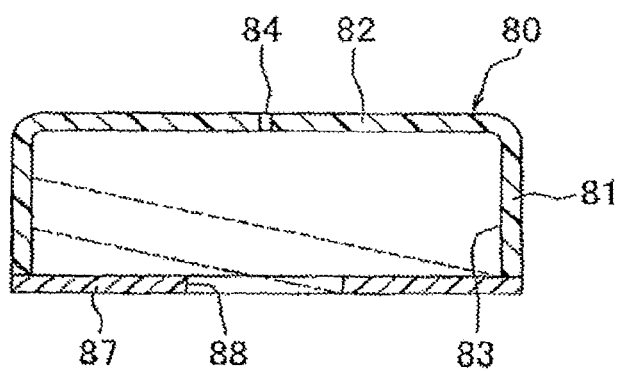
FIG. 14 is a sectional view that illustrates a schematic structure of a sub-float valve 80 according to a third embodiment of the invention.

As shown in FIG. 14, in the present embodiment, the sub-float valve 80 includes a member, in which the sidewall 81 and the ceiling 82 are formed into one piece, and the bottom plate 87. The member and the bottom plate 87 are joined together by bonding or the like. Preferably, the joint portion between the member, in which the sidewall 81 and the ceiling 82 are formed into one piece, and the bottom plate 87 is airtight and liquid-tight over their entire periphery. An opening 88 is formed at the center of the bottom plate 87. This allows the air storage recess 83 of the sub-float valve 80 of the present embodiment to have a lower-end opening area smaller than the cross-sectional area of the upper portion of the air storage recess 83.

As described in the first and the second embodiments, as the vehicle makes a turn or the like, a horizontal acceleration is applied accordingly. This causes liquid fuel to be unevenly distributed in the fuel tank 2. Therefore, a surface of the fuel is inclined and the surface level rises.

As the inclined fuel surface is moving up, the lower end of the sub-float valve 80 is covered by the liquid fuel. At the time when the sub-float valve 80 starts floating again, the liquid fuel enters into, for example, a position shown by a chain double-dashed line in FIG. 14 with the inclination of the fuel surface. In the fill-up control valve device of the present embodiment, the air storage recess 83 has a smaller lower-end opening area to reduce an amount of the liquid fuel that enters into the air storage recess 83 at the time when the sub-float valve 80 starts floating in order to suppress a decrease in buoyancy of the sub-float valve 80. That is, degradation in the floating function of the sub-float valve 80 can be prevented.

In this regard, in the case that the sub-float valve 80 is not provided with the bottom plate 87 having the opening 88, liquid fuel enters into a position shown by a dotted line in FIG. 14. Therefore, buoyancy of this sub-float valve 80 decreases compared to the buoyancy obtained in the present embodiment.

Figure 15:
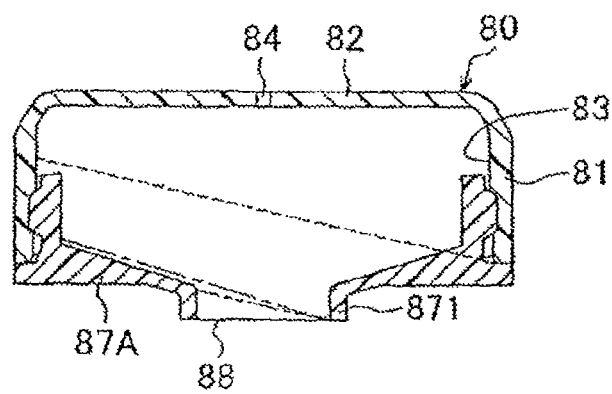
FIG. 15 is a sectional view that illustrates a schematic structure of a sub-float valve 80 according to a modification of the third embodiment of the invention.

FIG. 15 illustrates a sub-float valve 80 according to a modification of the present embodiment. The sub-float valve 80 shown in FIG. 15 includes a member, in which the sidewall 81 and the ceiling 82 are formed into one piece, and a bottom plate 87A. The member and the bottom plate 87A are engaged by snap-fitting, for example. Preferably, the engagement portion between the member, in which the sidewall 81 and the ceiling 82 are formed into one piece, and the bottom plate 87A is airtight and liquid-tight over their entire periphery. The member, in which the sidewall 81 and the ceiling 82 are formed into one piece, and the bottom plate 87A may be joined together not only by engagement, but also by bonding, welding, or the like. Alternatively, the sidewall 81, the ceiling 82, and the bottom plate 87A may be formed into one piece by blow-molding or the like.

A downwardly-protruding tubular portion 871 is formed at the center of the bottom plate 87A. The opening 88 is defined by a lower end of the tubular portion 871. This allows the air storage recess 83 of the sub-float valve 80 of the modification to have a lower-end opening area smaller than the cross-sectional area of the upper portion of the air storage recess 83. In addition, an upper surface of the bottom plate 87A is an inclined surface that is inclined upward gradually from an upper end of the tubular portion 871 to the outer side.

As the inclined fuel surface is moving up due to a horizontal acceleration applied when the vehicle makes a turn or the like, the lower end of the sub-float valve 80 is covered by the liquid fuel. At the time when the sub-float valve 80 starts floating again, the liquid fuel enters into, for example, a position shown by a chain double-dashed line in FIG. 15 with the inclination of the fuel surface.

In the fill-up control valve device according to the modification of the third embodiment, the air storage recess 83 has a smaller lower-end opening area, and the opening 88 is formed at the lower end of the tubular portion 871. Therefore, when the sub-float valve 80 starts floating, liquid fuel only enters into a part of the tubular portion 871 to further reduce the amount of the liquid fuel that enters into the air storage recess 83 in order to reliably suppress a decrease in buoyancy of the sub-float valve 80. That is, degradation in the floating function of the sub-float valve 80 can be reliably prevented.

In this regard, in the case that the sub-float valve 80 is not provided with the bottom plate 87A having the opening 88, liquid fuel enters into a position shown by a dotted line in FIG. 15. Therefore, buoyancy of this sub-float valve 80 decreases compared to the buoyancy obtained in the present embodiment.

In addition, in the sub-float valve 80 shown in FIG. 15, the upper surface of the bottom plate 87A is an inclined surface that is inclined moderately upward from the upper end of the cylindrical portion 871 to the outer side. Therefore, an increase in the amount of liquid fuel that enters into the air storage recess 83 can be suppressed, even when the fuel surface is inclined relatively largely and the liquid fuel enters into, for example, a position shown by a dot-and-dash line in FIG. 15.

Fourth Embodiment

A fourth embodiment of the present invention is next described with reference to FIG. 16.

The fourth embodiment of the present invention is different in a float configuration of the float valve 50 from the foregoing first embodiment. Like numerals denote like elements between the first and the fourth embodiments, and descriptions thereof are not repeated.

Figure 16:
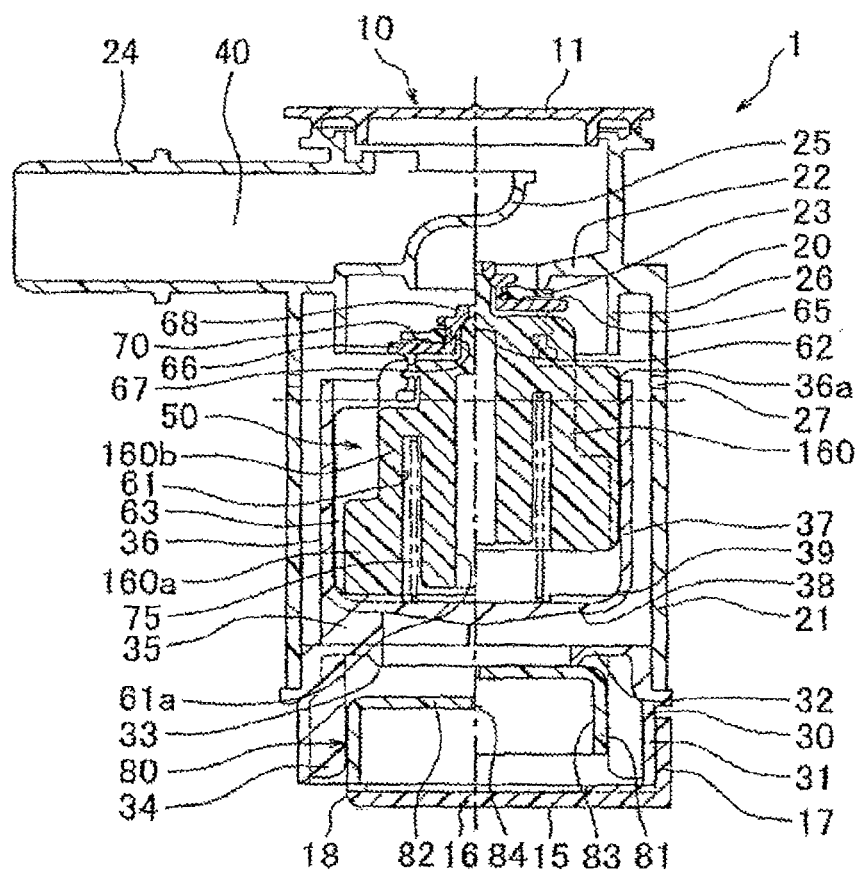
FIG. 16 is a sectional view that illustrates a schematic structure of a fill-up control valve device 1 according to a fourth embodiment of the invention.

As shown in FIG. 16, in the present embodiment, a float 160 of the float valve 50 includes a lower portion 160a located below a middle portion of the float 160 and an upper portion 160b located above the middle portion. The upper portion 160b has an outer diameter smaller than the outer diameter of the lower portion 160a.

In this configuration, a clearance between an inner peripheral surface of the sidewall 37 of the container 36 and an outer peripheral surface of the float 160 is larger between the upper portion 160b of the float 160 and the sidewall 37 than between the lower portion 160a of the float 160 and the sidewall 37. This is, a cross-sectional area of a space, in which liquid fuel can be contained, between the inner peripheral surface of the sidewall 37 of the container 36 and the outer peripheral surface of the float 160 is smaller in a lower portion of the space than in an upper portion of the space.

Therefore, when the liquid fuel stored in the container 36 is discharged from the liquid drainage hole 39, the fuel surface in the container 36 falls slowly in the upper portion of the space and falls more quickly in the lower portion of the space than the upper portion. This ensures that the float valve 50 is kept in a closed state for a sufficient period of time, while allowing the float valve 50 to be quickly open afterward.

In FIG. 16, the upper portion 160b located above the middle portion of the float 160 has an outer diameter smaller than the outer diameter of the lower portion 160a located below the middle portion of the float 160, such that the cross-sectional area of the space, in which liquid fuel can be contained, between the inner peripheral surface of the sidewall 37 of the container 36 and the outer peripheral surface of the float 160 is smaller in the lower portion of the space than in the upper portion of the space. However, the present invention is not limited thereto. Alternatively, the sidewall 37 of the container 36 may have different inner diameters between upper and lower portions of the sidewall 37, such that a cross-sectional area of a space, in which liquid fuel can be contained, is smaller in a lower portion of the space than in an upper portion of the space. Further alternatively, the sidewall 37 of the container 36 may have different inner diameters between upper and lower portions of the sidewall 37, while the float 160 may have different outer diameters between upper and lower portions of the float 160, such that a cross-sectional area of a space, in which liquid fuel can be contained, is smaller in a lower portion of the space than in an upper portion of the space.

Fifth Embodiment

A fifth embodiment of the present invention is next described with reference to FIGS. 17 to 19.

The fifth embodiment of the invention is different from the foregoing first embodiment in that an additional configuration is provided in which when the vehicle starts running after refueling, liquid fuel in the container is discharged quickly. Like numerals denote like elements between the first and the fifth embodiments, and descriptions thereof are not repeated.

Figure 17:
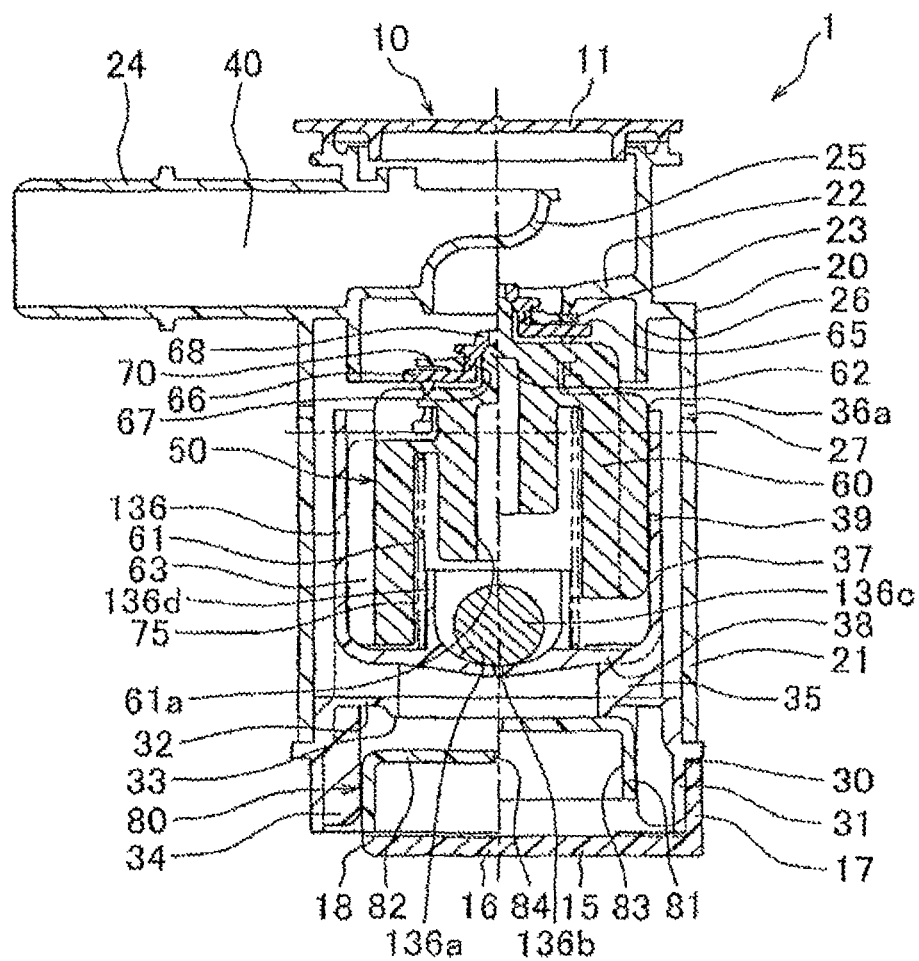
FIG. 17 is a sectional view that illustrates a schematic structure of a fill-up control valve device 1 according to a fifth embodiment of the invention.

As shown in FIG. 17, a container 136 of the present embodiment includes a recess 136a that is formed at the center of the bottom surface 38 and that is recessed downward from the top to form a curved surface. A discharge port 136b is formed at the center of the recess 136a and extends through the bottom surface 38 in the vertical direction. In the recess 136a, a spherical valve body 136c (corresponding to a discharge-port opening/closing valve) is disposed. The spherical valve body 136c has a diameter larger than the diameter of the discharge port 136b.

An upright wall 136d is provided around a periphery of the recess 136a (more inward than the spring 75) such that the spherical valve body 136c is not removed from the recess 136a. The upright wall 136d is not formed all around the entire periphery surrounding the recess 136a such that the upright wall 136d does not interfere with a flow of liquid fuel into the recess 136a. In other words, the upright wall 136d is provided around the entire periphery of the recess 136a to surround the recess 136a, while being partially formed with a vertically-extending slit in the circumferential direction such that the upright wall 136d does not to interfere with a flow of liquid fuel into the recess 136a.

Figure 18:
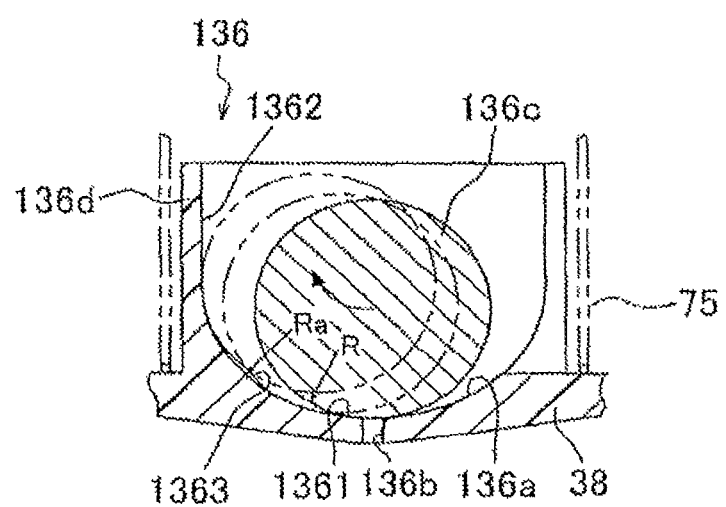
FIG. 18 is an enlarged sectional view that illustrates an essential part of a container 136 according to the fifth embodiment of the invention.

FIG. 18 illustrates an enlarged view of a location where the spherical valve body is disposed. As shown in FIG. 18, in the recess 136a on the bottom surface 38, a peripheral edge of the discharge port 136b serves as a sealing surface 1361 with which the spherical valve body 136c comes into contact when closing the discharge port 136b.

The sealing surface 1361 and an inside surface 1362 (an inner-peripheral-side surface) of the upright wall 136d are connected through a connecting curved surface 1363. The connecting curved surface 1363 has a radius of curvature Ra (a radius of curvature of the connecting curved surface 1363 in vertical cross section shown in FIG. 18 or a radius of curvature of the connecting curved surface 1363 in cross section that passes through the axis of the container 136) that is larger than a radius R of the spherical valve body 136c. The connecting curved surface 1363 connects the sealing surface 1361 and the inside surface 1362 smoothly (such that the gradient changes continuously).

In this configuration, when the vehicle is stopping during refueling or the like, the spherical valve body 136c is positioned at the center in the recess 136*a* to close the discharge port 136*b*. At this time, the spherical valve body 136*c* is in contact with the sealing surface 1361 along its entire periphery. In contrast, when the vehicle starts running after stopping, the spherical valve body 136*c* moves horizontally relative to the container 136 due to inertia and opens the discharge port 136*b*. At this time, the spherical valve body 136*c* is away from the sealing surface 1361.

Therefore, when the vehicle starts running after refueling, the spherical valve body 136*c* opens the discharge port 136*b* to quickly discharge liquid fuel in the container 136 from the liquid drainage hole 39 and the discharge port 136*b*, and the float valve 50 enters an open state quickly.

A passage cross-sectional area of the discharge port 136*b* is not particularly limited, but may preferably be larger than the passage cross-sectional area of the liquid drainage hole 39. The discharge port 136*b* is formed to have a larger passage cross-sectional area to allow liquid fuel in the container 136 to be discharged very quickly, and also to prevent the passage from being clogged with foreign matters and so on.

When the vehicle starts running after refueling, the spherical valve body 136*c* moves horizontally relative to the container. At this time, the spherical valve body 136*c* is suppressed from hitting against the upright wall 136*d*. The sealing surface 1361 and the inside surface 1362 of the upright wall 136*d* are smoothly connected through the connecting curved surface 1363 that has the radius of curvature Ra larger than the radius R of the spherical valve body 136*c*. Therefore, the spherical valve body 136*c* that has moved horizontally toward the upright wall 136*d* moves along the connecting curved surface 1363, while gradually changing its moving direction.

For example, the spherical valve body 136*c* moves as shown by chain double-dashed lines in FIG. 18. At this time, the center of the spherical valve body 136*c* changes its moving direction smoothly as shown by a dot-and-dash arrow in FIG. 18. This suppresses the spherical valve body 136*c* from hitting against the upright wall 136*d*. In this manner, a hitting sound can be suppressed from being produced when the spherical valve body 136*c* moves. No hitting sound is produced when the spherical valve body 136*c* is away from the sealing surface 1361 to move within the container 36, because the spherical valve body 136*c* is always in contact at one point with the container 36.

Figure 19:
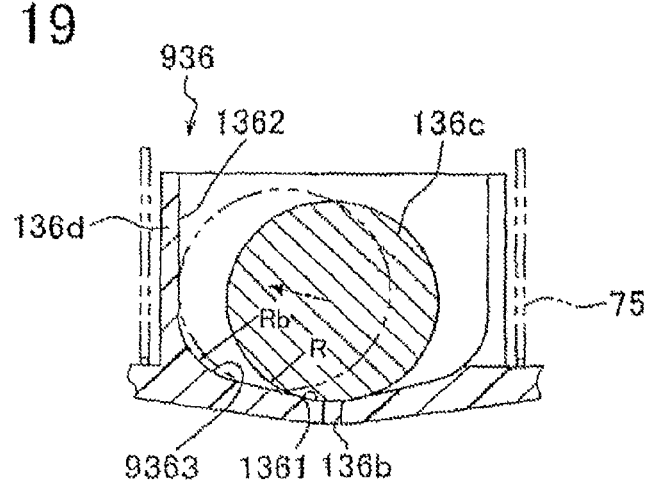
FIG. 19 is a sectional view that illustrates a part of a container.

As an example, FIG. 19 illustrates a container 936 in which the sealing surface 1361 and the inside surface 1362 of the upright wall 136*d* are connected through a connecting curved surface 9363 that has a radius of curvature Rb smaller than the radius R of the spherical valve body 136*c*. In the case of the container 936, the spherical valve body 136*c*, which has moves horizontally, moves as shown by a chain double-dashed line in FIG. 19 (such that the center of the spherical valve body 136*c* moves as shown by a dot-and-dash arrow), and hits against the upright wall 136*d* in point contact with the upright wall 136*d*. A hitting sound is thereby produced. When the spherical valve body 136*c* moves within the container 936 and comes into contact with the upright wall 136*d*, that is, the spherical valve body 136*c* comes into contact at plural points (two points in this example) with the container 936, the hitting sound is thereby produced.

According to the configuration of the present embodiment, when the spherical valve body 136*c*, which has been away from the sealing surface 1361 and moved to the position where the spherical valve body 136*c* comes into contact with the inside surface 1362 of the upright wall 136*d*, returns to a position where the spherical valve body 136*c* comes into contact with the sealing surface 1361, the spherical valve body 136*c* also moves along the connecting curved surface 1363, while gradually changing its moving direction. Therefore, the spherical valve body 136*c* can be suppressed from hitting against an upper surface of the recess 136*a* and from producing a hitting sound.

Other Embodiment

The preferred embodiments of the present invention have been described above. However, the present invention is not limited to the aforementioned embodiments, and a variety of changes and modifications may be made to these embodiments without departing the spirit and scope of the present invention.

In the aforementioned embodiments, the sub-float valve 80 is disposed below the float valve 50. However, the present invention it not limited thereto. The sub-float valve 80 may be located in any portion upstream of the container 36, 136 that accommodates therein the float valve 50 in the discharge direction of the ventilation passage 40 formed within the casing 10 (in the discharge direction from the interior to the exterior of the fuel tank 2). That is, the sub-float valve 80 may open and close the ventilation passage 40 on the upstream side of the float valve 50 in the discharge direction.

Figure 20:
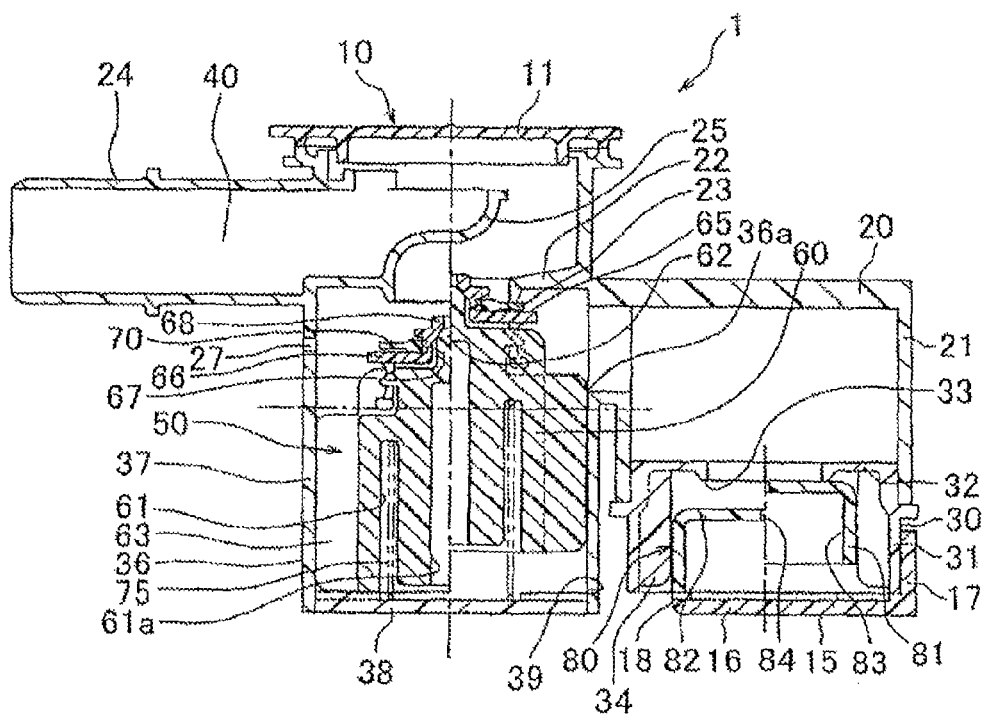
FIG. 20 is a sectional view that illustrates a schematic structure of a fill-up control valve device 1 according to another embodiment of the invention.

Therefore, as shown in FIG. 20, for example, the sub-float valve 80 may be disposed beside the float valve 50. This allows the fill-up control valve device 1 to have a smaller dimension in its height direction. For example, in the case that the first predetermined level or the fill-up surface level in the fuel tank is close to the ceiling of the fuel tank, the fill-up control valve device in which the float valve 50 and the sub-float valve 80 are aligned horizontally to have a smaller height dimension is used effectively.

Figure 21:
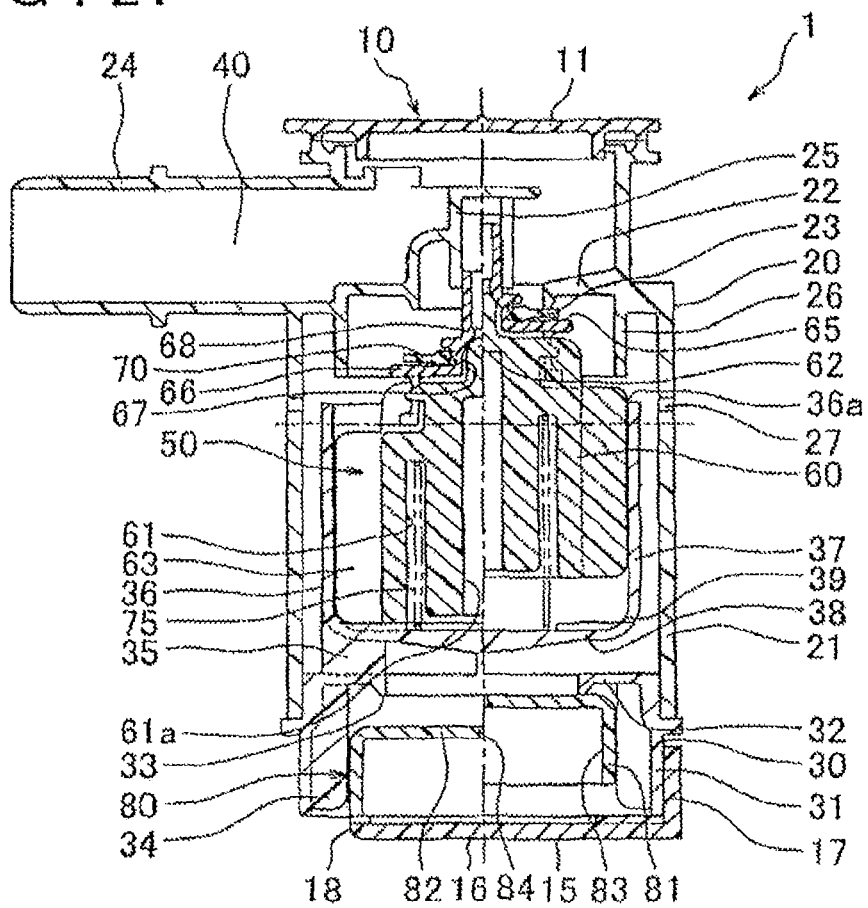
FIG. 21 is a sectional view that illustrates a schematic structure of a fill-up control valve device 1 according to still another embodiment of the invention.

In the aforementioned embodiments, when the float valve 50 is displaced in the vertical direction, the float valve 50 is guided by a sliding contact of the guide ribs 63 of the float 60, 160 with the sidewall 37 of the container 36. However, the present invention is not limited thereto. For example, as shown in FIG. 21, the sealing plate 65 may be provided with an upwardly-extending tubular portion 68, and the upper case 20 may be provided with a slitted cylindrical portion that is in sliding contact with an outer peripheral surface of the tubular portion 68, such that the float valve 50 may be guided by a sliding contact of the guide ribs 63 of the float 60, 160 with the sidewall 37 of the container 36 and by a sliding contact of the tubular portion 68 of the sealing plate 65 with the sated cylindrical portion of the upper case 20. This allows the float valve 50 to be guided at two points, an upper point and a lower point, and therefore allows the float valve 50 to be displaced so stably that the axis of the float valve 50 is not inclined.

Figure 22:
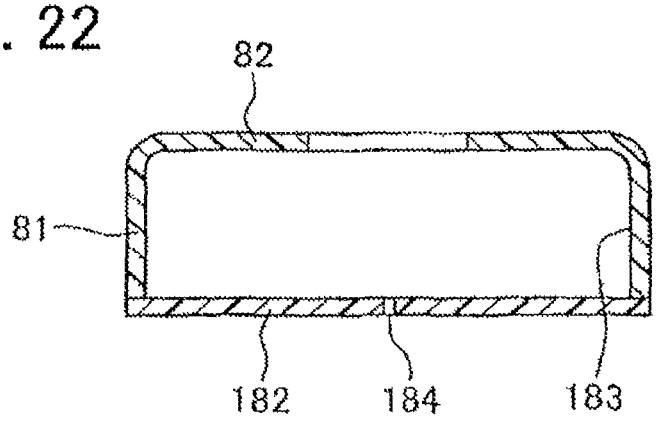
FIG. 22 is a sectional view that illustrates a schematic structure of a sub-float valve according to still another embodiment of the invention.
Figure 23:
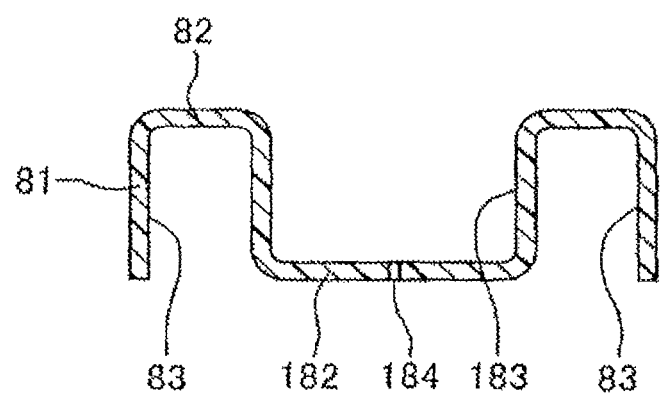
FIG. 23 is a sectional view that illustrates a schematic structure of a sub-float valve according to still another embodiment of the invention.

In addition, in the aforementioned embodiments, the sub-float valve 80 includes the air storage recess 83 that is recessed upward from the lower-end surface, and the air-discharge hole 84 that communicates the air storage recess 83 with the ventilation passage 40 located on the downstream side of the sub-float valve 80 in the discharge direction. However, the present invention is not limited thereto. For example, as shown in FIG. 22, a sub-float valve may include an air storage recess 183 that is recessed downward from its upper-end surface, and a liquid inflow hole 184. The liquid inflow hole 184 is formed on a bottom 182 (a lower wall) to communicate the air storage recess 183 with the upstream side (the lower side) of the sub-float valve in the discharge direction to allow liquid fuel to flow into the air storage recess 183. This configuration also allows the sub-float valve to function. In addition, as shown in FIG. 23, for example, the air storage recess 83 that is recessed upward from its lower-end surface and the air storage recess 183 that is recessed downward from its upper-end surface may be combined. This configuration also allows the sub-float valve to function.

In the aforementioned embodiments, the liquid drainage hole 39 is provided on the sidewall 37 of the container 36, 136. However, the present invention is not limited thereto. For example, the liquid drainage hole 39 may alternatively be provided on the bottom surface 38 of the container 36.

In the fifth embodiment of the invention, the discharge-port opening/closing valve is provided by employing a relatively simple configuration in which the recess 136a is provided on the bottom surface 38 of the container 136 to form the discharge port 136b, and the spherical valve body 136c is disposed in the recess 136a. However, the present invention is not limited thereto, as long as the discharge-port opening/closing valve reliably closes the discharge port when the vehicle is stopping, and reliably opens the discharge port when the vehicle starts running after stopping.

In the aforementioned embodiments, the casing 10 includes four members: the upper case 20, the lower case 30, the cap 11, and the end cap 15. However, the present invention is not limited thereto. The casing 10 may include less than four members or include more than four members.

In the aforementioned embodiments, the fill-up control valve device 1 is a valve device that opens and closes the ventilation passage that communicably connects the interior space of the fuel tank 2 and the canister 9 provided external to the fuel tank 2. However, the fill-up control valve device 1 may also be applicable to a case where no canister is provided, as long as the fill-up control valve device 1 opens and closes the ventilation passage that communicates the interior of the fuel tank with the exterior of the fuel tank.

It is a feature that the air storage recess has a lower-end opening area smaller than the cross-sectional area of the upper portion.

For example, when the vehicle in which the fuel tank is installed makes a turn or the like, and a fuel surface largely rises to or above the first predetermined level at the position where the fill-up control valve device is fitted into the fuel tank, the fuel surface tends to be inclined largely. According to the inventions described in the claims, for example, even when the vehicle in which the fuel tank is installed makes a turn or the like, and the fuel surface is inclined so largely as to rise to or above the first predetermined level, liquid fuel is suppressed from entering into the air storage recess, compared to an air storage recess that has a lower-end opening area equal to or larger than the cross-sectional area of the upper portion above the lower-end opening. This can prevent degradation in the floating function of the second float valve when the vehicle makes a turn or the like.

It is a feature that the second float valve has an upper wall positioned above the air storage recess and a partition wall that extends downward from the upper wall and that partitions the air storage recess into plural sections.

According to this feature, the air storage recess of the second float valve is partitioned into plural sections by the partition wall that extends downward from the upper wall. Therefore, even when the fuel surface is inclined so largely as to rise to or above the first predetermined level, liquid fuel is suppressed from entering into the air storage recess, compared to an unpartitioned air storage recess. This can prevent degradation in the floating function of the second float valve when the vehicle makes a turn or the like.

The fill-up control valve device has a discharge port and a discharge-port opening/closing valve. The discharge port is separate from the discharge passage and formed in the container to discharge liquid fuel contained in the container to an exterior of the container. The discharge-port opening/closing valve closes the discharge port when the vehicle is stopping, and opens the discharge port when the vehicle starts running after stopping. According to this structure of the fill-up control valve device, when the vehicle starts running after refueling, the discharge-port opening/closing valve opens the discharge port to quickly discharge liquid fuel in the container, so that the first float valve enters an open state quickly.

The discharge port is formed to extend through a bottom of the container; the discharge-port opening/closing valve has a spherical valve body that is disposed in the container; the spherical valve body comes into contact with a sealing surface that is formed around a peripheral edge of the discharge port on the bottom to close the discharge port, when the vehicle is stopping, and the spherical valve body moves horizontally relative to the container due to inertia away from the sealing surface to open the discharge port, when the vehicle starts running after stopping; the container includes an upright wall that is provided on an outer peripheral side of the sealing surface and that extends upward from the bottom; and the sealing surface and an inner-peripheral-side surface of the upright wall are connected smoothly through a connecting curved surface that has a radius of curvature larger than the radius of the spherical valve body.

According to the fill-up control valve device, when the vehicle starts running after refueling, the spherical valve body moves horizontally relative to the container due to inertia away from the sealing surface to open the discharge port. Because the sealing surface and the inner-peripheral-side surface of the upright wall are connected smoothly through the connecting curved surface that has a radius of curvature larger than the radius of the spherical valve body, the spherical valve body, which has moved horizontally toward the upright wall, moves along the connecting curved surface, while gradually changing its moving direction. Therefore, the spherical valve body is prevented from hitting against the upright wall. This can suppress a hitting sound from being produced when the spherical valve body moves.

A cross-sectional area of a space, in which liquid fuel can be contained, between an inner surface of the container and an outer surface of the first float valve is smaller in a lower portion of the space than in an upper portion of the space. According to this structure, when the liquid fuel stored in the container is discharged from the discharge passage, the fuel surface in the container falls slowly in the upper portion of the space and falls more quickly in the lower portion of the space than the upper portion. Therefore, this ensures that the first float valve is kept in a closed state for a sufficient period of time, while allowing the first float valve to be quickly open afterward.

The second float valve is disposed below the first float valve. According to this feature, the fill-up control valve device can have a smaller horizontal dimension. For example, in a case where the fill-up control valve device is fitted into the fuel tank through an opening provided on the ceiling of the fuel tank, the opening on the fuel tank can be formed smaller in size.

The second float valve is disposed beside the first float valve. According to this structure, the fill-up control valve device can have a smaller dimension in its height direction.

For example, in a case where the first predetermined level or the fill-up surface level in the fuel tank is close to the ceiling of the fuel tank, the fill-up control valve device described in the claims is used very effectively.

What is claimed is:

1. A fill-up control valve device comprising:
a casing which is mounted to a fuel tank installed in a vehicle and in which a ventilation passage that communicates an interior of the fuel tank with an exterior of the fuel tank to allow gas in the interior of the fuel tank to be discharged to the exterior of the fuel tank is formed; and
a first float valve that is provided vertically movably in an accommodation space formed in the casing, that floats on liquid fuel in the casing, and that is configured to open and close the ventilation passage with a vertical movement of a fuel surface in the casing, wherein:
the casing has a vent hole that communicates an interior space of the fuel tank with the accommodation space;
the casing includes a container that is a container which has a bottom surface and in which the first float valve is disposed;
the container includes an introduction port that is an introduction port provided above the bottom surface and that introduces liquid fuel into the container, and a discharge passage that is provided below the introduction port to extend through the container and that discharges the liquid fuel introduced from the introduction port into the container to an exterior of the container, wherein the discharge passage has a passage cross-sectional area smaller than an opening area of the introduction port;
the fill-up control valve device further comprises a second float valve that is provided vertically movably in the accommodation space in the casing, the accommodation space being formed in an upstream portion located upstream of a location where the container is disposed in a discharge direction of the ventilation passage, and that is configured to open and close the ventilation passage with a vertical movement of the fuel surface in the casing; and
the second float valve has an air storage recess that is recessed upward, and an air-discharge hole that communicates the air storage recess with the ventilation passage located on a downstream side of the second float valve in the discharge direction.

2. The fill-up control valve device according to claim 1, wherein the air storage recess has a lower-end opening area smaller than a cross-sectional area of an upper portion.

3. The fill-up control valve device according to claim 1, wherein the second float valve has an upper wall that is positioned above the air storage recess, and a partition wall that extends downward from the upper wall and that partitions the air storage recess into plural sections.

4. The fill-up control valve device according to claim 1, further comprising:
a discharge port that is separate from the discharge passage and is formed in the container to discharge liquid fuel contained in the container to the exterior of the container; and
a discharge-port opening/closing valve that closes the discharge port when the vehicle is in a stopped state and that opens the discharge port when the vehicle that has been in the stopped state starts running.

5. The fill-up control valve device according to claim 4, wherein:
the discharge port extends through a bottom of the container;
the discharge-port opening/closing valve has a spherical valve body that is disposed in the container;
the spherical valve body is configured to come into contact with a sealing surface that is formed around a peripheral edge of the discharge port on the bottom of the container to close the discharge port, when the vehicle is in the stopped state; and
the spherical valve body is configured to move horizontally relative to the container due to inertia away from the sealing surface to open the discharge port, when the vehicle that has been in the stopped state starts running,
the container includes an upright wall that is provided on an outer peripheral side of the sealing surface and that extends upward from the bottom; and
the sealing surface and an inner-peripheral-side surface of the upright wall are connected smoothly through a connecting curved surface that has a radius of curvature larger than a radius of the spherical valve body.

6. The fill-up control valve device according to claim 1, wherein a cross-sectional area of a space in which liquid fuel can be contained, between an inner surface of the container and an outer surface of the first float valve is smaller in a lower portion of the space than in an upper portion of the space.

7. The fill-up control valve device according to claim 1, wherein:
the first float valve is configured to close the ventilation passage when a fuel surface in the fuel tank rises and reaches a first predetermined level and the fuel surface in the casing is pressed up to a second predetermined level higher than the first predetermined level; and
the casing has the vent hole that is provided above the second predetermined level.

8. The fill-up control valve device according to claim 7, wherein the second predetermined level is a fuel surface level in the casing when a valve body of the first float valve is seated on a valve seat.

9. The fill-up control valve device according to claim 7, wherein the second predetermined level is a level of an upper end of a sidewall of the container.

10. The fill-up control valve device according to claim 1, wherein the second float valve is disposed below the first float valve.

11. The fill-up control valve device according to claim 1, wherein the second float valve is disposed beside the first float valve.

12. The fill-up control valve device according to claim 1, wherein the air-discharge hole is configured such that,
when the fuel surface rises due to refueling of the fuel tank, air is hardly discharged from the air storage recess and the air in the air storage recess causes the second float valve to float on liquid fuel, and
after the second float valve closes the ventilation passage in the upstream portion, the air in the air storage recess is discharged from the air-discharge hole to cause the second float valve to sink into the liquid fuel to open the ventilation passage at the upstream portion.

13. A fill-up control valve device comprising:
a casing which is mounted to a fuel tank installed in a vehicle and including:
a ventilation passage that allows gas in an interior of the fuel tank to be discharged to an exterior of the fuel tank is formed such that a fuel surface in the casing is pressed up when a fuel surface in the fuel tank rises and reaches a first predetermined level, and an end cap configured to close an end of the casing and which has a notch communicating with an interior of the casing to an exterior of the casing;

a first float valve that is provided vertically movably in a first accommodation space formed in the casing, that is configured to open and close the ventilation passage with a vertical movement of the fuel surface in the casing, and that closes the ventilation passage when the fuel surface in the casing exceeds a second predetermined level higher than the first predetermined level; and a second float valve that is provided vertically movably in a second accommodation space in the casing, the second accommodation space being formed in an upstream portion located upstream of the first float valve in a discharge direction of the ventilation passage, and that is configured to open and close the ventilation passage in the upstream portion with a vertical movement of the fuel surface in the casing, wherein the second float valve has:
an air storage recess that is recessed upward, wherein when the fuel surface in the casing exceeds a third predetermined level higher than the first predetermined level, air can be stored in the air storage recess and the air in the air storage recess causes the second float valve to float on liquid fuel to close the ventilation passage in the upstream portion; and an air-discharge hole that communicates the air storage recess with the ventilation passage, wherein when the fuel surface in the casing exceeds the third predetermined level, after the second float valve floats on the liquid fuel, the air in the air storage recess is discharged from the air-discharge hole to cause the second float valve to sink into the liquid fuel to open the ventilation passage at the upstream portion.

14. The fill-up control valve device according to claim 13, wherein the second predetermined level is a fuel surface level in the casing when a valve body of the first float valve is seated on a valve seat.

15. The fill-up control valve device according to claim 13, wherein the second predetermined level is a level of an upper end of a sidewall of the container.

16. The fill-up control valve device according to claim 13, wherein the second float valve is disposed below the first float valve.

17. The fill-up control valve device according to claim 13, wherein the second float valve is disposed beside the first float valve.

18. The fill-up control valve device according to claim 13, wherein the air-discharge hole is configured such that,
when the fuel surface rises due to refueling of the fuel tank, air is hardly discharged from the air storage recess and the air in the air storage recess causes the second float valve to float on liquid fuel, and
after the second float valve closes the ventilation passage in the upstream portion, the air in the air storage recess is discharged from the air-discharge hole to cause the second float valve to sink into the liquid fuel to open the ventilation passage at the upstream portion.

19. A fill-up control valve device comprising:
a casing which is mounted to a fuel tank installed in a vehicle and in which a ventilation passage that communicates an interior of the fuel tank with an exterior of the fuel tank to allow gas in the interior of the fuel tank to be discharged to the exterior of the fuel tank is formed; and a first float valve that is provided vertically movably in an accommodation space formed in the casing, that floats on liquid fuel in the casing, and that is configured to open and close the ventilation passage with a vertical movement of a fuel surface in the casing, wherein:

the casing has a vent hole that communicates an interior space of the fuel tank with the accommodation space;

the casing includes a container that is a container which has a bottom surface and in which the first float valve is disposed;

the container includes an introduction port that is an introduction port provided above the bottom surface and that introduces liquid fuel into the container, and a discharge passage that is provided below the introduction port to extend through the container and that discharges the liquid fuel introduced from the introduction port into the container to an exterior of the container, wherein the discharge passage has a passage cross-sectional area smaller than an opening area of the introduction port;

the fill-up control valve device further comprises a second float valve that is provided vertically movably in the accommodation space in the casing, the accommodation space being formed in an upstream portion located upstream of a location where the container is disposed in a discharge direction of the ventilation passage, and that is configured to open and close the ventilation passage with a vertical movement of the fuel surface in the casing; and the second float valve has an air storage recess that is recessed downward, and a liquid fuel inflow hole that communicates the air storage recess with the ventilation passage located on an upstream side of the second float valve in the discharge direction.

20. The fill-up control valve device according to claim 19, further comprising:
a discharge port that is separate from the discharge passage and is formed in the container to discharge liquid fuel contained in the container to the exterior of the container; and a discharge-port opening/closing valve that closes the discharge port when the vehicle is in a stopped state and that opens the discharge port when the vehicle that has been in the stopped state starts running.

21. The fill-up control valve device according to claim 20, wherein:
the discharge port extends through a bottom of the container;

the discharge-port opening/closing valve has a spherical valve body that is disposed in the container;

the spherical valve body is configured to come into contact with a sealing surface that is formed around a peripheral edge of the discharge port on the bottom of the container to close the discharge port, when the vehicle is in the stopped state; and the spherical valve body is configured to move horizontally relative to the container due to inertia away from the sealing surface to open the discharge port, when the vehicle that has been in the stopped state starts running, the container includes an upright wall that is provided on an outer peripheral side of the sealing surface and that extends upward from the bottom; and the sealing surface and an inner-peripheral-side surface of the upright wall are connected smoothly through a connecting curved surface that has a radius of curvature larger than a radius of the spherical valve body.

22. The fill-up control valve device according to claim 19, wherein a cross-sectional area of a space in which liquid fuel can be contained, between an inner surface of the container and an outer surface of the first float valve is smaller in a lower portion of the space than in an upper portion of the space.

23. The fill-up control valve device according to claim 19, wherein:
the first float valve is configured to close the ventilation passage when a fuel surface in the fuel tank rises and reaches a first predetermined level and the fuel surface in the casing is pressed up to a second predetermined level higher than the first predetermined level; and
the casing has the vent hole that is provided above the second predetermined level.

24. The fill-up control valve device according to claim 23, wherein the second float valve has an air storage recess that is recessed upward, and in which air can be stored when the fuel surface in the casing exceeds a third predetermined level higher than the first predetermined level.

25. The fill-up control valve device according to claim 24, wherein the upward air storage recess has a lower-end opening area smaller than a cross-sectional area of an upper portion.

26. The fill-up control valve device according to claim 24, wherein the second float valve has an upper wall that is positioned above the upward air storage recess, and a partition wall that extends downward from the upper wall and that partitions the upward air storage recess into plural sections.

27. The fill-up control valve device according to claim 23, wherein the second predetermined level is a fuel surface level in the casing when a valve body of the first float valve is seated on a valve seat.

28. The fill-up control valve device according to claim 23, wherein the second predetermined level is a level of an upper end of a sidewall of the container.

29. The fill-up control valve device according to claim 19, wherein the second float valve is disposed below the first float valve.

30. The fill-up control valve device according to claim 19, wherein the second float valve is disposed beside the first float valve.

31. The fill-up control valve device according to claim 19, wherein
the liquid fuel inflow hole is configured such that:
when the fuel surface rises due to refueling of the fuel tank, air is hardly discharged from the air storage recess and the air in the air storage recess causes the second float valve to float on liquid fuel, and
after the second float valve closes the ventilation passage in the upstream portion, the liquid fuel is introduced into the air storage recess through the liquid fuel inflow hole to cause the second float valve to sink into the liquid fuel to open the ventilation passage at the upstream portion.

32. A fill-up control valve device comprising:
a casing which is mounted to a fuel tank installed in a vehicle and including:
a ventilation passage that allows gas in an interior of the fuel tank to be discharged to an exterior of the fuel tank is formed such that a fuel surface in the casing is pressed up when a fuel surface in the fuel tank rises and reaches a first predetermined level, and
an end cap configured to close an end of the casing and which has a notch communicating with an interior of the casing to an exterior of the casing;
a first float valve that is provided vertically movably in a first accommodation space formed in the casing, that is configured to open and close the ventilation passage with a vertical movement of the fuel surface in the casing, and that closes the ventilation passage when the fuel surface in the casing exceeds a second predetermined level higher than the first predetermined level; and
a second float valve that is provided vertically movably in a second accommodation space in the casing, the second accommodation space being formed in an upstream portion located upstream of the first float valve in a discharge direction of the ventilation passage, and that is configured to open and close the ventilation passage in the upstream portion with a vertical movement of the fuel surface in the casing, wherein
the second float valve has:
an air storage recess that is recessed downward, wherein when the fuel surface in the casing exceeds a third predetermined level higher than the first predetermined level, air can be stored in the air storage recess and the air in the air storage recess causes the second float valve to float on liquid fuel to close the ventilation passage in the upstream portion; and
a liquid fuel inflow hole that communicates the air storage recess with the ventilation passage, wherein when the fuel surface in the casing exceeds the third predetermined level, after the second float valve floats on the liquid fuel, the liquid fuel is introduced into the air storage recess through the liquid fuel inflow hole to cause the second float valve to sink into the liquid fuel to open the ventilation passage at the upstream portion.

33. The fill-up control valve device according to claim 32, wherein the second float valve has an air storage recess that is recessed upward, and in which air can be stored when the fuel surface in the casing exceeds a third predetermined level higher than the first predetermined level.

34. The fill-up control valve device according to claim 33, wherein the upward air storage recess has a lower-end opening area smaller than a cross-sectional area of an upper portion.

35. The fill-up control valve device according to claim 33, wherein the second float valve has an upper wall that is positioned above the upward air storage recess, and a partition wall that extends downward from the upper wall and that partitions the upward air storage recess into plural sections.

36. The fill-up control valve device according to claim 32, wherein the second predetermined level is a fuel surface level in the casing when a valve body of the first float valve is seated on a valve seat.

37. The fill-up control valve device according to claim 32, wherein the second predetermined level is a level of an upper end of a sidewall of the container.

38. The fill-up control valve device according to claim 32, wherein the second float valve is disposed below the first float valve.

39. The fill-up control valve device according to claim 32, wherein the second float valve is disposed beside the first float valve.

40. The fill-up control valve device according to claim 32, wherein
the liquid fuel inflow hole is configured such that:
when the fuel surface rises due to refueling of the fuel tank, air is hardly discharged from the air storage recess and the air in the air storage recess causes the second float valve to float on liquid fuel, and
after the second float valve closes the ventilation passage in the upstream portion, the liquid fuel is introduced into the air storage recess through the liquid fuel inflow hole to cause the second float valve to sink into the liquid fuel to open the ventilation passage at the upstream portion.

41. A fill-up control valve device for use in a vehicle having a fuel tank, the fill-up control valve device comprising:
a casing mounted to the fuel tank and including:
a ventilation passage communicating with an interior of the fuel tank to an exterior of the fuel tank, the ventilation passage being configured to allow gas in the interior of the fuel tank to be discharged to the exterior of the fuel tank, and
an end cap configured to close an end of the casing and which has a notch communicating with an interior of the casing to an exterior of the casing;
a first float valve provided vertically movably in an accommodation space formed in the casing, the first float valve being configured to float on liquid fuel in the casing, and configured to open and close the ventilation passage with a vertical movement of a fuel surface in the casing; and
a second float valve provided vertically movably in the accommodation space formed in an upstream portion of a location in the casing, the second float valve being configured to open an close the ventilation passage with a vertical movement of a fuel surface in the casing, wherein:
the first float valve is configured to close the ventilation passage when a fuel surface in the fuel tank rises by a fuel flowing into the casing via the notch of the end cap and reaches a first predetermined level, and a fuel surface in the casing is pressed up to a second predetermined level higher than the first predetermined level;
the casing has a vent hole that is provided above the second predetermined level and that communicates an interior space of the fuel tank with the accommodation space;
the casing includes a container which has a bottom surface and in which the first float valve is disposed;
the container includes: (i) an introduction port provided above the bottom surface and that introduces liquid fuel into the container until the liquid fuel reaches the second predetermined level, and (ii) a discharge passage provided below the introduction port to extend through the container and configured to discharge the liquid fuel introduced from the introduction port into the container to an exterior of the container, the discharge passage includes a passage cross-sectional area smaller than an opening area of the introduction port;
the location of the second float valve is disposed in the casing where the container is disposed in a discharge direction of the ventilation passage;
the second float valve has an air storage recess that is recessed upward, and an air-discharge hole that communicates the air storage recess with the ventilation passage located on a downstream side of the second float valve in the discharge direction;
the second float valve is configured to float on liquid fuel in the casing to close the ventilation passage when air is stored in the air storage recess, in a case that a fuel surface in the fuel tank rises and reaches the first predetermined level, and then a fuel surface in the accommodation space formed in the upstream portion in the casing is pressed up to a third predetermined level higher than the first predetermined level;
the second float valve is configured to not float on liquid fuel in the casing to open the ventilation passage when air in the air storage recess is discharged from the air-discharge hole and the liquid fuel enters into the air storage recess, in a case that a fuel surface in the fuel tank rises by the fuel flowing into the case via the notch of the end cap and reaches the first predetermined level, and then a fuel surface in the accommodation space formed in the upstream portion in the casing is pressed up to a third predetermined level higher than the first predetermined level;
the casing includes an upper tubular case accommodating the first float valve, a lower tubular case accommodating the second float valve and a pipe; and
the ventilation passage is formed within the casing to ventilate the lower tubular case, the upper tubular case and the pipe successively from the end of the casing at which the notch of the end cap is formed to allow gas in the fuel tank to be discharged,
wherein the second predetermined level is a surface level in the container when a valve body of the first float valve is seated on a valve seat to close the ventilation passage.

42. A fill-up control valve device for use in a vehicle having a fuel tank, the fill-up control valve device comprising:
a casing mounted to the fuel tank and including:
a ventilation passage communicating with an interior of the fuel tank to an exterior of the fuel tank, the ventilation passage being configured to allow gas in the interior of the fuel tank to be discharged to the exterior of the fuel tank, and
an end cap configured to close an end of the casing and which has a notch communicating with an interior of the casing to an exterior of the casing;
a first float valve provided vertically movably in an accommodation space formed in the casing, the first float valve being configured to float on liquid fuel in the casing, and configured to open and close the ventilation passage with a vertical movement of a fuel surface in the casing; and
a second float valve provided vertically movably in the accommodation space formed in an upstream portion of a location in the casing, the second float valve being configured to open an close the ventilation passage with a vertical movement of a fuel surface in the casing, wherein:
the first float valve is configured to close the ventilation passage when a fuel surface in the fuel tank rises by a fuel flowing into the casing via the notch of the end cap and reaches a first predetermined level, and a fuel surface in the casing is pressed up to a second predetermined level higher than the first predetermined level;
the casing has a vent hole that is provided above the second predetermined level and that communicates an interior space of the fuel tank with the accommodation space;
the casing includes a container which has a bottom surface and in which the first float valve is disposed;

the container includes: (i) an introduction port provided above the bottom surface and that introduces liquid fuel into the container until the liquid fuel reaches the second predetermined level, and (ii) a discharge passage provided below the introduction port to extend through the container and configured to discharge the liquid fuel introduced from the introduction port into the container to an exterior of the container, the discharge passage includes a passage cross-sectional area smaller than an opening area of the introduction port;

the location of the second float valve is disposed in the casing where the container is disposed in a discharge direction of the ventilation passage;

the second float valve has an air storage recess that is recessed upward, and an air-discharge hole that communicates the air storage recess with the ventilation passage located on a downstream side of the second float valve in the discharge direction;

the second float valve is configured to float on liquid fuel in the casing to close the ventilation passage when air is stored in the air storage recess, in a case that a fuel surface in the fuel tank rises and reaches the first predetermined level, and then a fuel surface in the accommodation space formed in the upstream portion in the casing is pressed up to a third predetermined level higher than the first predetermined level;

the second float valve is configured to not float on liquid fuel in the casing to open the ventilation passage when air in the air storage recess is discharged from the air-discharge hole and the liquid fuel enters into the air storage recess, in a case that a fuel surface in the fuel tank rises by the fuel flowing into the case via the notch of the end cap and reaches the first predetermined level, and then a fuel surface in the accommodation space formed in the upstream portion in the casing is pressed up to a third predetermined level higher than the first predetermined level;

the casing includes an upper tubular case accommodating the first float valve, a lower tubular case accommodating the second float valve and a pipe; and the ventilation passage is formed within the casing to ventilate the lower tubular case, the upper tubular case and the pipe successively from the end of the casing at which the notch of the end cap is formed to allow gas in the fuel tank to be discharged, wherein the second predetermined level is a level of an upper end of a sidewall of the container.

* * * * *